United States Patent
Nakao

(10) Patent No.: US 9,020,269 B2
(45) Date of Patent: Apr. 28, 2015

(54) IMAGE PROCESSING DEVICE, IMAGE PROCESSING METHOD, AND RECORDING MEDIUM

(71) Applicant: Sony Corporation, Tokyo (JP)

(72) Inventor: Yuta Nakao, Kanagawa (JP)

(73) Assignee: Sony Corporation (JP)

( * ) Notice: Subject to any disclaimer, the term of this patent is extended or adjusted under 35 U.S.C. 154(b) by 253 days.

(21) Appl. No.: 13/671,108

(22) Filed: Nov. 7, 2012

(65) Prior Publication Data

US 2013/0129221 A1  May 23, 2013

(30) Foreign Application Priority Data

Nov. 18, 2011 (JP) ................. 2011-252227

(51) Int. Cl.
*G06K 9/62* (2006.01)
*H04N 5/232* (2006.01)

(52) U.S. Cl.
CPC .............. *G06K 9/62* (2013.01); *H04N 5/23232* (2013.01); *H04N 5/23245* (2013.01)

(58) Field of Classification Search
CPC .................. G06T 2207/10016; G06T 3/4038; G06T 5/001; G06K 9/00228; G06K 9/48

USPC ............... 382/190, 284, 254, 118; 348/207.1, 348/E5.079
See application file for complete search history.

(56) References Cited

FOREIGN PATENT DOCUMENTS

JP  2005-323411 A  11/2005
JP  2009-181258   *  8/2009

OTHER PUBLICATIONS

Ono, an English machine translation of JP2009-181258, Aug. 13, 2009.*

* cited by examiner

*Primary Examiner* — Ruiping Li
(74) *Attorney, Agent, or Firm* — Lerner, David, Littenberg, Krumholz & Mentlik, LLP

(57) ABSTRACT

There is provided an image processing device including a synthesis processing portion configured to perform a synthesis process of performing addition on pixels including a region of a subject included in an input image and terminate the synthesis process on the basis of a detection result of a subject detection portion which detects the subject of the input image.

20 Claims, 27 Drawing Sheets

IMAGE PROCESSING DEVICE, IMAGE PROCESSING METHOD, AND RECORDING MEDIUM

CROSS-REFERENCE TO RELATED APPLICATION

The present application claims priority from Japanese Patent Application No. JP 2011-252227 filed in the Japanese Patent Office on Nov. 18, 2011, the entire content of which is incorporated herein by reference.

BACKGROUND OF THE INVENTION

The present technology relates to an image processing device, an image processing method, and a recording medium, and particularly to an image processing device, an image processing method, and a recording medium capable of easily generating an image by performing multiple exposures.

In the past, there has been a method using multiple exposures (hereinafter referred to as multi-exposure photography) for generating an image in which a plurality of images are superimposed by exposing the same film multiple times in a photography method using a silver salt camera. According to the multi-exposure photography, for example, when photographing a firework spreading in a circular shape from a certain center point, it is possible to generate an image of linear traces of light. In order to perform the multi-exposure photography, normally, a user sets the bulb exposure (an exposure state where the shutter is opened for a long period of time) in a state where the front of the lens is covered with a black screen and the like. Then, the user repeats an operation, which removes the black screen from the front of the lens for a predetermined period of time and covers the front of the lens again with the black screen multiple times, whereby it is possible to generate a multiple exposure image.

Some digital cameras have a bulb photographing function of opening the shutter for a long period of time. Further, there is proposed a technique of causing a digital camera to generate a multiple exposure image (refer to, for example, Japanese Unexamined Patent Application Publication No. 2005-323411).

BRIEF SUMMARY OF THE INVENTION

However, since the bulb photographing function is limited to a high-function digital camera for the experienced, it is difficult for a so-called compact digital camera to perform the multi-exposure photography.

Further, even when the digital camera has a bulb photographing function, it is difficult for a user to perform photography at optimum shutter timing which is similar to the timing at which a professional photographer performs photography. If the shutter timing is inappropriate, for example, in a generated image of the example of the photography of the firework mentioned above, the light traces may be disconnected in the middle of the traces, while the light traces may be started from the middle thereof, or the light traces may appear as points.

There is a method of causing a personal computer to synthesize a plurality of photographed images which are photographed by a digital camera for a short period of time through post-processing by using an image editing application, but the work therefore is very complicated.

The present technology has been made in view of the above situation, and it is desirable to provide a technique of easily generating an image by multiple exposures.

According to an embodiment of the present technology, there is provided an image processing device including a synthesis processing portion configured to perform a synthesis process of performing addition on pixels including a region of a subject included in an input image and terminate the synthesis process on the basis of a detection result of a subject detection portion which detects the subject of the input image.

According to another embodiment of the present technology, there is provided an image processing method including a step of causing an image processing device, which has a synthesis processing portion configured to perform a synthesis process on at least a part of a region of an input image, to perform a synthesis process of performing addition on pixels including a region of a subject included in an input image and terminate the synthesis process on the basis of a detection result of a subject detection process of detecting the subject of the input image.

According to a further embodiment of the present technology, there is provided a computer-readable recording medium storing a program that causes a computer to execute processes of: performing a synthesis process of performing addition on pixels including a region of a subject included in an input image; and terminating the synthesis process on the basis of a detection result of a subject detection process of detecting the subject of the input image.

In the embodiment of the present technology, the synthesis process of performing addition on pixels including the region of the subject included in the input image is performed, and the synthesis process is terminated on the basis of the detection result of the subject detection process of detecting the subject of the input image.

The image processing device may be a separate device, and may also be an internal block constituting one device.

According to the embodiment of the present technology, it is possible to easily generate an image through multiple exposures.

DETAILED DESCRIPTION OF EMBODIMENTS

Exemplary Configuration of Image Processing Device

Figure 1:
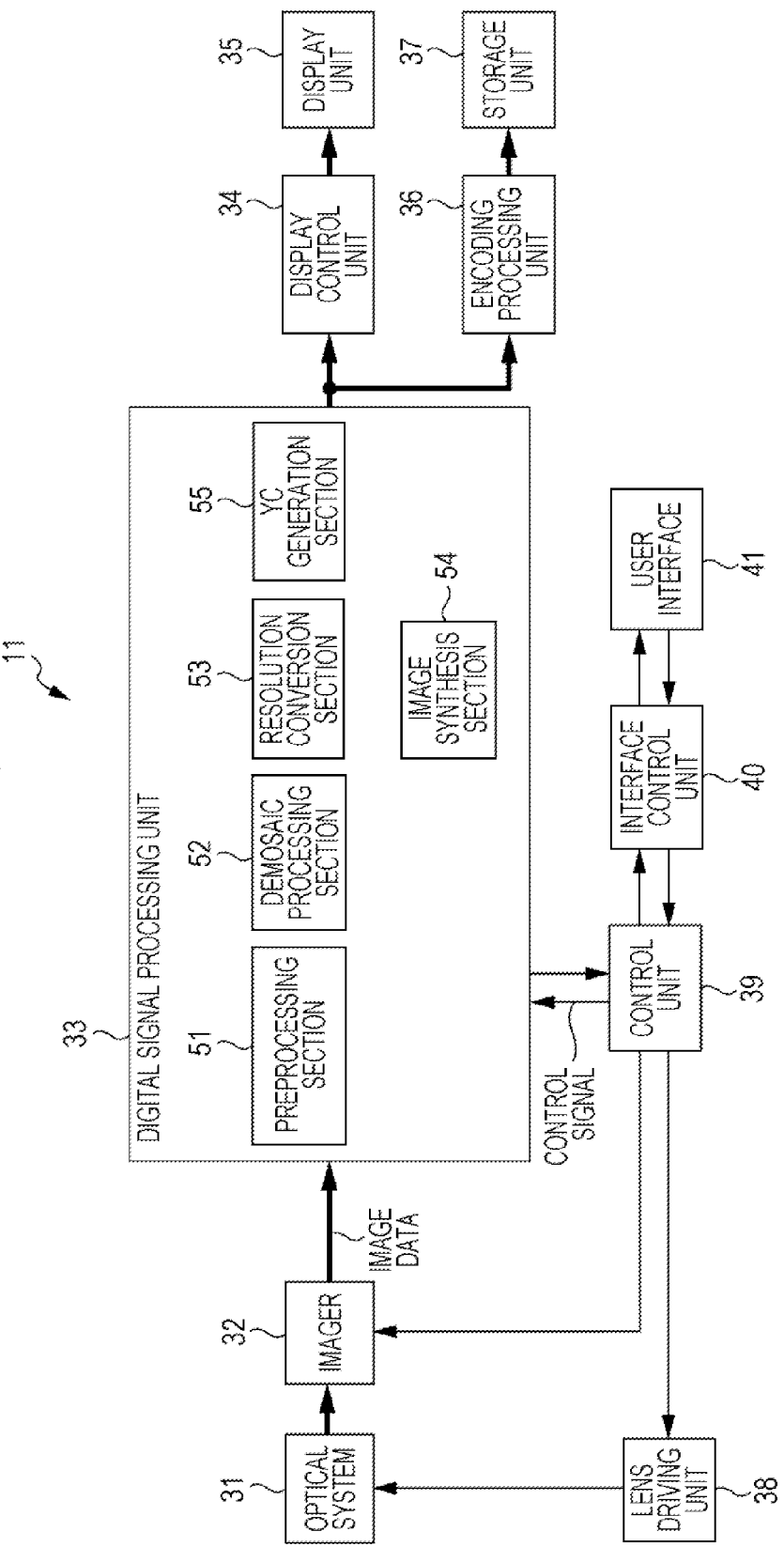
FIG. 1 is a block diagram illustrating an exemplary configuration of an embodiment of an image processing device according to the present technology.

FIG. 1 is a block diagram illustrating an exemplary configuration of an embodiment of an image processing device according to the present technology.

The image processing device 11 of FIG. 1 not only has a normal photographing function (normal photography mode) of displaying and recording a photographed image taken by photographing a subject, but also a multiple exposure function (multi-exposure photography mode) to easily generate a multiple exposure image in which a plurality of photographed images taken by continuous shooting are synthesized. The image processing device 11 is incorporated as a part of an image capturing apparatus such as a digital video camera or a digital still camera.

The image processing device 11 includes an optical system 31, an imager 32, a digital signal processing unit 33, a display control unit 34, a display unit 35, an encoding processing unit 36, a storage unit 37, a lens driving unit 38, a control unit 39, an interface control unit 40, and a user interface 41.

The optical system 31 is formed as an optical system including an imaging lens not shown in the drawings. The light incident in the optical system 31 is incident onto the imager 32 including an imaging element such as a CCD (Charge Coupled Device). The imager 32 captures an image of the subject by photoelectrically converting the light which is incident from the optical system 31. The imager 32 converts an analog electric signal (a captured image signal), which is obtained by the image capturing, into image data of a digital signal through an A/D (Analog to Digital) conversion portion which is not shown in the drawings, and supplies the image data to the digital signal processing unit 33.

The digital signal processing unit 33 is formed as a DSP (Digital Signal Processor) or the like, and performs predetermined signal processing on the image data supplied from the imager 32. The digital signal processing unit 33 includes at least a preprocessing section 51, a demosaic processing section 52, a resolution conversion section 53, an image synthesis section 54, and a YC generation section 55.

The preprocessing section 51 performs, on the image data supplied from the imager 32, preprocessing such as a clamp process of clamping the black levels of R (Red), G (Green), and B (Blue) at predetermined levels and a correction process between color channels of R, G, and B. The demosaic processing section 52 performs, on the image data preprocessed by the preprocessing section 51, a demosaic process of supplementing the color components of pixels so that each pixel of the image data has all the color components R, G, and B.

The resolution conversion section 53 and the image synthesis section 54 perform predetermined image processing on the photographed image subjected to the demosaic process as necessary.

The resolution conversion section 53 performs a resolution conversion process of converting a predetermined resolution which is set (designated) by a user in the user interface 41.

When a user selects the multi-exposure photography mode, the image synthesis section 54 synthesizes (superimposes) a plurality of photographed images, thereby performing an image synthesis process of generating a multiple exposure image.

The YC generation section 55 performs the YC generation process of generating (separating) a luminance (Y) signal and a color (C) signal from the image data of R, G, and B subjected to the demosaic process by the demosaic processing section 52. When performing predetermined image processing, the resolution conversion section 53 and the image synthesis section 54 perform the YC generation process on the processed image data.

The display control unit 34 converts the digital image data, which is supplied from the digital signal processing unit 33, into an analog image signal, and displays the image on the display unit 35. The display unit 35 displays the image, which is supplied from the display control unit 34, in accordance with the control of the display control unit 34. For example, the LCD (Liquid Crystal Display) or the like may be employed as the display unit 35.

The encoding processing unit 36 encodes the image data, which is supplied from the digital signal processing unit 33, using a predetermined encoding format, and supplies the encoded image data, which is obtained from the result thereof, to the storage unit 37.

The storage unit 37 has a recording medium such as a hard disk or a nonvolatile memory, and stores the encoded image data, which is supplied from the encoding processing unit 36, in a recording medium.

The lens driving unit 38 controls driving of a motor of the optical system 31 on the basis of the control of the control unit 39 so as to drive an imaging lens.

The control unit 39 controls the respective units of the image processing device 11 in response to the control signal supplied from the interface control unit 40.

For example, the control unit 39 supplies processing parameters, which correspond to the operation mode designated by a user, to the digital signal processing unit 33. Further, the control unit 39 supplies a control signal, which is for driving the imaging lens in the optical system 31 or adjusting the diaphragm, to the lens driving unit 38. Furthermore, the control unit 39 controls the imager 32 such that it captures the input image.

The user interface 41 includes an input device such as a button and a switch, an output device such as a microphone, and the like. The user interface 41 is operated when a user inputs an instruction to start or terminate image capturing, change the operation mode, and change setting values and the like to the image processing device 11. In addition, the user interface 41 also includes an input device such as electrostatic touch panel which is formed on the screen of the display unit 35 and assists a user to perform input by touching the screen of the display unit 35 with a finger or the like.

The image processing device 11 is configured as described above.

Exemplary Configuration of Image Synthesis Section

Figure 2:
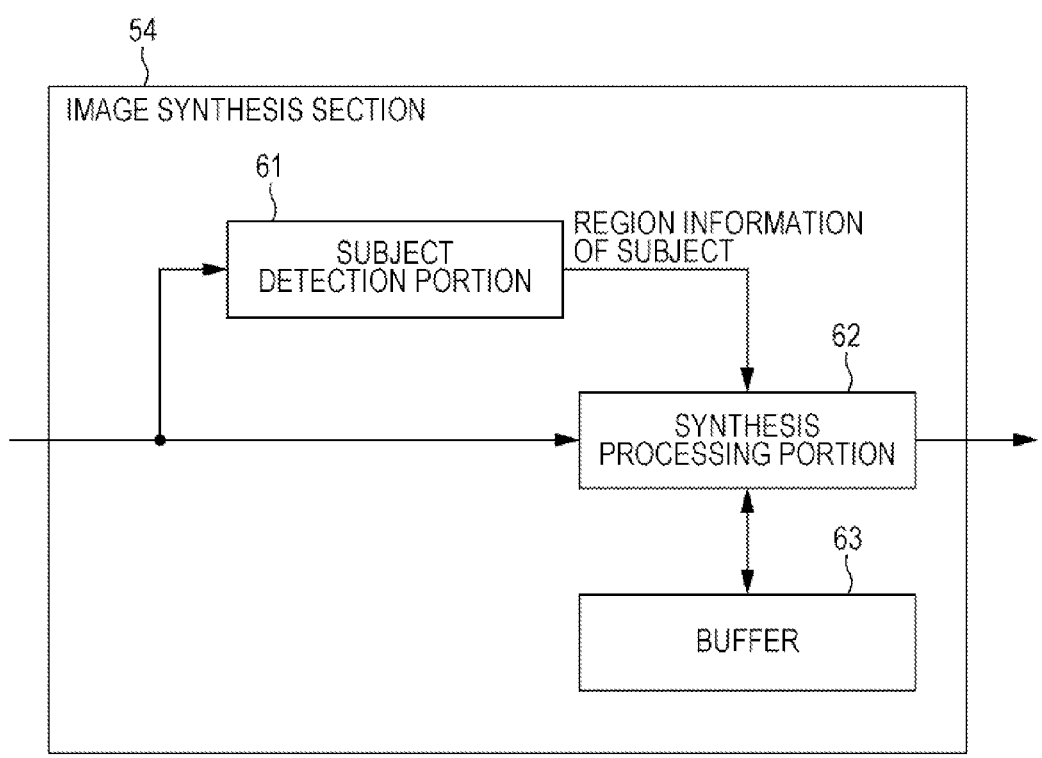
FIG. 2 is a block diagram illustrating an exemplary configuration of an image synthesis section.

FIG. 2 is a block diagram illustrating a functional configuration example of the image synthesis section 54 that generates a multiple exposure image in the multi-exposure photography mode.

The image synthesis section 54 includes a subject detection portion 61, a synthesis processing portion 62, and a buffer 63. The image synthesis section 54 is supplied with the photographed image, which is subjected to the demosaic process, as an input image from the demosaic processing section 52, and the image is supplied to the subject detection portion 61 and the synthesis processing portion 62.

The subject detection portion 61 detects a subject from the photographed image subjected to the demosaic process as an input image, and performs the subject tracking process of tracking the subject. The subject detection portion 61 outputs region information, which is obtained as the result of the subject tracking process and relates to a region (subject region) in which the subject is included in the input image, to the synthesis processing portion 62. In the embodiment, the subject region information, which is output from the subject detection portion 61 to the synthesis processing portion 62, is information on the size of the rectangular region which is formed to surround the subject detected in the input image. It should be noted that, as other subject region information, for example, information on the position (the barycenter position or the center position) of the rectangular region surrounding the subject may be further output. Further, it is possible to employ various kinds of existing methods as the method of detecting the subject region, and thus the method is not limited to a specific method. An example of the method of detecting the subject region will be described later in and after FIG. 7.

The synthesis processing portion 62 performs the synthesis process on the input images, which are sequentially supplied from the demosaic processing section 52, on the basis of the subject region information sent from the subject detection portion 61, thereby generating a synthetic image. Specifically, when the input image N(p) of the p-th frame (p>0) is supplied from the demosaic processing section 52, the synthesis processing portion 62 generates the synthetic image G(p) of the p-th frame by performing the following process.

$$\text{Input Image } N(p) - \text{Synthetic Image } G(p-1) = \text{Difference Image } D(p) \quad (1)$$

$$\text{Synthetic Image } G(p-1) + \text{Difference Image } D(p) = \text{Synthetic Image } G(p) \quad (2)$$

Here, the frame count p representing the p-th frame does not mean the number of frames which are input from the demosaic processing section 52 to (the synthesis processing portion 62 of) the image synthesis section 54, but means the number of frames of the input images counted when the frame at which the subject is detected first in the subject detection portion 61 is set as a first frame.

The synthesis processing portion 62, first, calculates the difference image D(p), which is obtained by calculating the difference between corresponding pixels of the synthetic image G(p−1) of the (p−1)th frame and the input image N(p) of the p-th frame in which the subject is detected. Next, the synthesis processing portion 62 performs addition on the pixels corresponding to each other between the obtained difference image D(p) and the synthetic image G(p−1) of the (p−1)th frame, and sets the resulting image as the synthetic image G(p) of the p-th frame.

Each synthetic image G(p), which is sequentially generated by the synthesis processing portion 62, is output to the display control unit 34 together with the input image N(p), and is also supplied to the buffer 63 in order to perform the synthesis process of the next input image N(p+1). The buffer 63 temporarily stores the synthetic image G(p), which is the processing result of the synthesis process at the p-th frame, in order for the synthesis process for the next frame. In addition, the buffer 63 may be configured as a part of the synthesis processing portion 62.

Further, when terminating the synthesis process of the input image, the synthesis processing portion 62 outputs the synthetic image G(p), which is finally obtained through the synthesis process, as the save image Gout to the encoding processing unit 36. The encoding processing unit 36 encodes the image data of the save image Gout, which is supplied from the synthesis processing portion 62, in a predetermined encoding format, and stores the image data in the storage unit 37.

Figure 3:
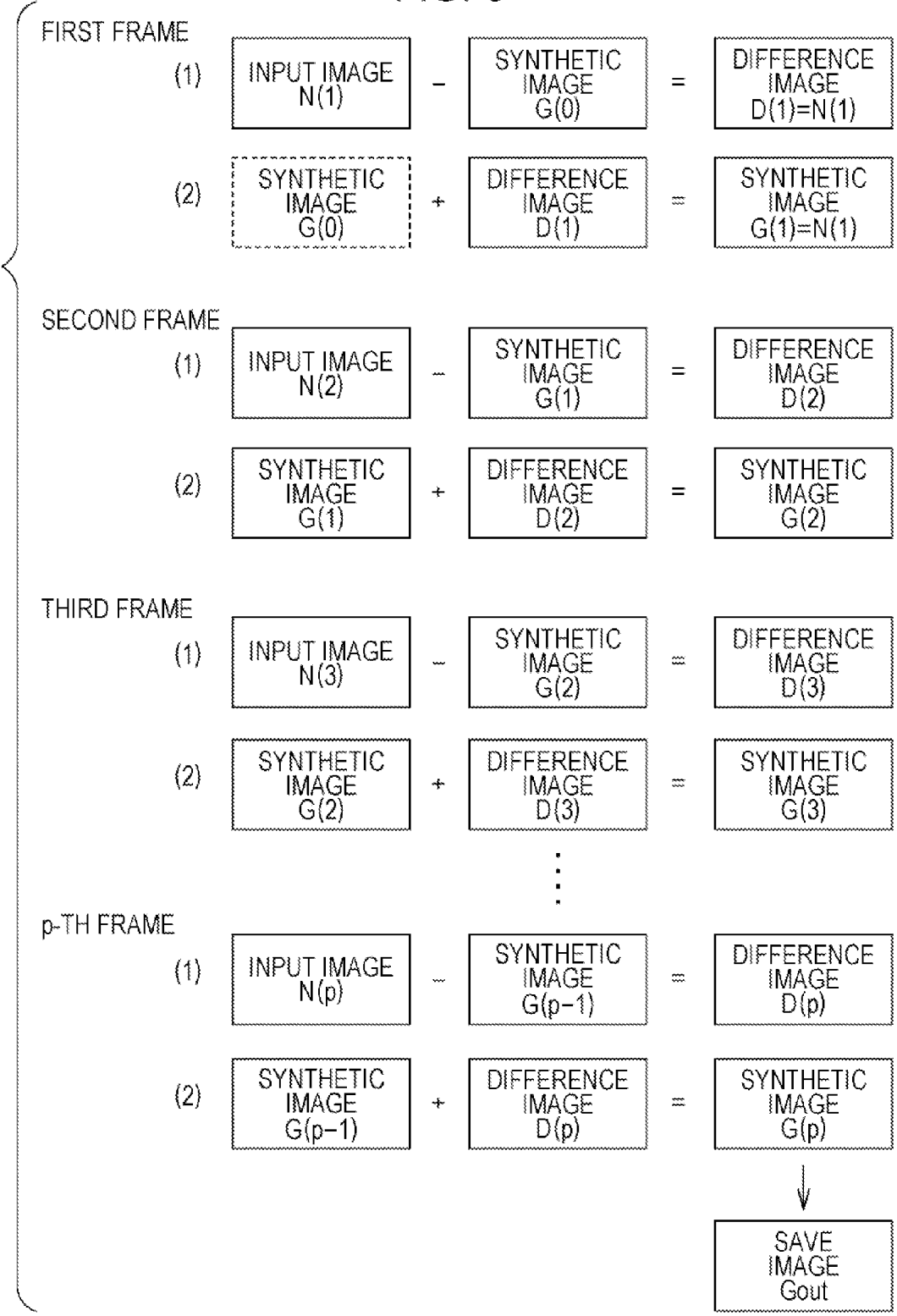
FIG. 3 is a diagram illustrating a synthesis process performed by a synthesis processing portion.

The generation of the synthetic image G(p) performed by the synthesis processing portion 62 will be further described with reference to FIG. 3.

The input image N(1) of the first frame as the photographed image, in which the subject is detected first by the subject detection portion 61, is supplied to the synthesis processing portion 62. At this time, since there is no synthetic image G(0) previous thereto, the input image N(1) is set as the difference image D(1) as it is, and is further set as the synthetic image G(1) as it is. That is, the synthetic image G(1), which is obtained from the result of the synthesis process for the input image N(1) of the first frame, is identical to the input image N(1) of the first frame.

Next, when the input image N(2) of the second frame is supplied to the synthesis processing portion 62, the synthesis processing portion 62 subtracts the synthetic image G(1), which is synthesized until the first frame, from the input image N(2) of the second frame, thereby calculating the difference image D(2). Then, the synthesis processing portion adds the difference image D(2), which is currently calculated, to the synthetic image G(1), which is synthesized until the first frame, thereby generating the synthetic image G(2) which is synthesized until the second frame.

When the input image N(3) of the third frame is supplied to the synthesis processing portion 62, the synthesis processing portion 62 subtracts the synthetic image G(2), which is synthesized until the second frame, from the input image N(3) of the third frame, thereby calculating the difference image D(3). Then, the synthesis processing portion adds the difference image D(3), which is hitherto calculated, to the synthetic image G(2), which is synthesized until the second frame, thereby generating the synthetic image G(3) which is synthesized until the third frame.

Subsequently, when the input image N(p) of the p-th frame is supplied to the synthesis processing portion 62, the synthesis processing portion 62 subtracts the synthetic image G(p−1), which is synthesized until the (p−1)th frame, from the input image N(p) of the p-th frame, thereby calculating the difference image D(p). Then, the synthesis processing portion adds the difference image D(p), which is hitherto calculated, to the synthetic image G(p−1), which is synthesized until the (p−1)th frame, thereby generating the synthetic image G(p) which is synthesized until the p-th frame.

As described above, the synthesis processing portion 62 performs the frame addition process using the input images N(1) to N(p) which are sequentially input, thereby generating the synthetic images G(1) to G(p).

The synthetic images G(1) to G(p), which are generated whenever the input image is supplied from the demosaic processing section 52, are output to the display control unit 34, and are displayed on the display unit 35. Thereby, a user is able to check the image in the process of generating the multiple exposure image through the display unit 35.

Then, for example, when the predetermined termination condition for terminating the synthesis process is satisfied in the input image N(p) of the p-th frame, the synthesis processing portion 62 outputs the synthetic image G(p), which is the result of the synthesis process based on the input image N(p) of the p-th frame, as the save image Gout to the encoding processing unit 36. In such a manner, the multiple exposure image, which is the photography result obtained by the multi-exposure photography of the user, is encoded in a predetermined encoding format, and is stored in the storage unit 37.

Multi-Exposure Photography Process

Next, the multi-exposure photography process of the image processing device 11 will be described with reference to the flowchart of FIG. 4. This process is started, for example, when a user changes the photography mode from the normal photography mode to the multi-exposure photography mode, or when a user performs an operation of starting photography after changing the photography mode to the multi-exposure photography mode, in the image processing device 11.

First, in step S201, the subject detection portion of the image synthesis section 54 starts performing the subject tracking process of detecting and tracking the subject on the photographed image which is supplied as the input image from the demosaic processing section 52 and is subjected to the demosaic process. Thereafter, the subject detection portion 61 sequentially performs the subject tracking process of detecting and tracking the subject in the input image, and supplies the subject region information to the synthesis processing portion 62. In addition, when it is difficult to detect the subject, the subject region information is not supplied to the synthesis processing portion 62.

In step S202, the synthesis processing portion 62 sets 1 to the frame count p that is a variable for counting the input images when the input image in which the subject is detected first is input as the first frame to the image synthesis section 54.

In step S203, the synthesis processing portion 62 determines whether the subject region information is supplied. As described above, when the subject is detected through the subject tracking process, the size of the rectangular region, which is formed to surround the subject detected in the input image, is supplied as the subject region information from the subject detection portion 61 to the synthesis processing portion 62. Accordingly, in step S203, it is determined whether or not the subject size is supplied from the subject detection portion 61, the process of step S203 is repeated until the subject size is supplied.

Then, in step S203, if it is determined that the subject region information is supplied, that is, if the subject size is supplied from the subject detection portion 61, the process advances to step S204.

In step S204, the synthesis processing portion 62 determines whether the size of the subject detected in the input image N(p) of the p-th frame is greater than the maximum value $SIZE_{MAX}$ of the subject size detected in the range of the input image of the first frame to the input image N(p−1) of the (p−1)th frame which is previous to the p-th frame. In addition, the maximum value $SIZE_{MAX}$ of the subject size is retained through the process of the next step S205, and is a variable for storing the maximum value of the subject sizes which have been detected until now. When the frame count p is 1, that is, when the subject detected in the input image of the previous frame is not present in the input image N(1) of the first frame, it is determined in step S204 that the subject size is greater than the maximum value.

In step S204, if it is determined that the size of the subject detected in the input image N(p) of the p-th frame is greater than the maximum value $SIZE_{MAX}$ of the subject size detected in the range of the input image of the first frame to the input image N(p−1) of the (p−1)th frame which is previous to the p-th frame, the process advances to step S205. In step S205, the synthesis processing portion 62 updates the maximum value $SIZE_{MAX}$ of the subject size to the size of the subject detected in the input image N(p) of the p-th frame, and retains the value in the buffer 63.

In step S206, the synthesis processing portion 62 generates the synthetic image G(p) at the p-th frame from the difference image D(p) of the p-th frame and the synthetic image G(p−1) which is synthesized until the (p−1)th frame. Specifically, first, the synthesis processing portion 62 calculates the difference image D(p) from the input image N(p) of the p-th frame and the synthetic image G(p−1) of the (p−1)th frame. Next, the synthesis processing portion 62 performs frame addition on the calculated difference image D(p) and the synthetic image G(p−1) which is synthesized until the (p−1)th frame, thereby generating the synthetic image G(p) of the p-th frame.

In step S207, the synthesis processing portion 62 outputs the generated synthetic image G(p) of the p-th frame to the display control unit 34 together with the input image N(p) of the p-th frame. As a result, the synthetic image G(p) of the p-th frame and the input image N(p) of the p-th frame are simultaneously displayed on the display unit 35 so as to be, for example, horizontally arranged with the same size by the display control unit 34. With such a configuration, a user is able to view both the input image N(p), which is a through-the-lens image during the photography, and the synthetic image G(p), which is an image obtained by the multi-exposure photography, at the same time.

After step S207, the process advances to step S208, the frame count p is incremented by 1, and then the process returns to step S203.

In contrast, in step S204 mentioned above, if it is determined that the size of the subject detected in the input image N(p) of the p-th frame is less than or equal to the maximum value $SIZE_{MAX}$ of the subject size detected in the range of the input image of the first frame to the input image N(p−1) of the (p−1)th frame which is previous to the p-th frame, the process advances to step S209.

In step S209, the synthesis processing portion 62 determines whether the subject size detected in the input image N(p) of the p-th frame is less than or equal to a predetermined proportion of the retained maximum value $SIZE_{MAX}$ of the subject size. That is, in step S209, it is sequentially determined whether the detected subject size is smaller than the maximum value $SIZE_{max}$ by the predetermined proportion. Here, the proportion for determining whether or not the detected subject size is small may be, for example, 0.8 (80%). In other words, the rate of decrease in the subject size from the maximum value $SIZE_{MAX}$ may be set to be greater than or equal to 20% or the like.

In step S209, if it is determined that the subject size detected in the input image N(p) of the p-th frame is greater than the predetermined proportion of the maximum value $SIZE_{MAX}$ being retained, the process advances to step S206 mentioned above.

In contrast, in step S209, if it is determined that the subject size detected in the input image N(p) of the p-th frame is less than or equal to the predetermined proportion of the maximum value $SIZE_{max}$ being retained, the process advances to step S210.

In step S210, the synthesis processing portion 62 outputs the synthetic image G(p) of the p-th frame and the input image N(p) to the display control unit 34, and outputs the synthetic image G(p) of the p-th frame as the save image Gout to the encoding processing unit 36. Thereby, the synthetic image G(p) of the p-th frame and the input image N(p) are displayed on the display unit 35, the save image Gout as the photography result of the multi-exposure photography is stored in the storage unit 37, and the multi-exposure photography process ends.

According to the above-mentioned multi-exposure photography process, the difference image D(p) between the input image N(p) of the p-th frame, in which the predetermined subject is detected, and the synthetic image G(p−1), which is synthesized until the previous frame, is calculated, and the addition process (synthesis process) is repeatedly performed thereon. Then, when the detected subject size is less than or equal to the predetermined proportion of the maximum value $SIZE_{MAX}$ of the subject sizes which have been detected by then, it is determined that it is difficult to detect the subject in the input image, and then the addition process of the difference image D(p) is terminated.

According to the multi-exposure photography process, if a user has to only change the photography mode to the multi-exposure photography mode and start photographing, the synthesis processing portion 62 determines whether to start or end the synthesis process of the input image on the basis of the detection result of the subject detection portion 61, thereby performing the multi-exposure photography process. Accordingly, it is not necessary for a user to determine and designate the shutter timing by themselves, and it is possible to obtain a multiple exposure image taken at appropriate shutter timings. Further, it is possible to perform photography without using tools such as a release cable and a blackout curtain which are necessary for existing multi-exposure photography. That is, according to the multi-exposure photography process of the image synthesis section 54, it is possible to easily obtain an image taken through multiple exposures.

Another Example of Multi-Exposure Photography Process

In many cases, the multiple exposure function is used to photograph fireworks. In photography of fireworks, it may be desired to photograph a plurality of fireworks, which are sequentially launched, as a single image. Hence, in the multi-exposure photography mode of the image processing device 11, it may be possible to photograph a plurality of fireworks, which are sequentially launched, as a single image.

Figure 5:
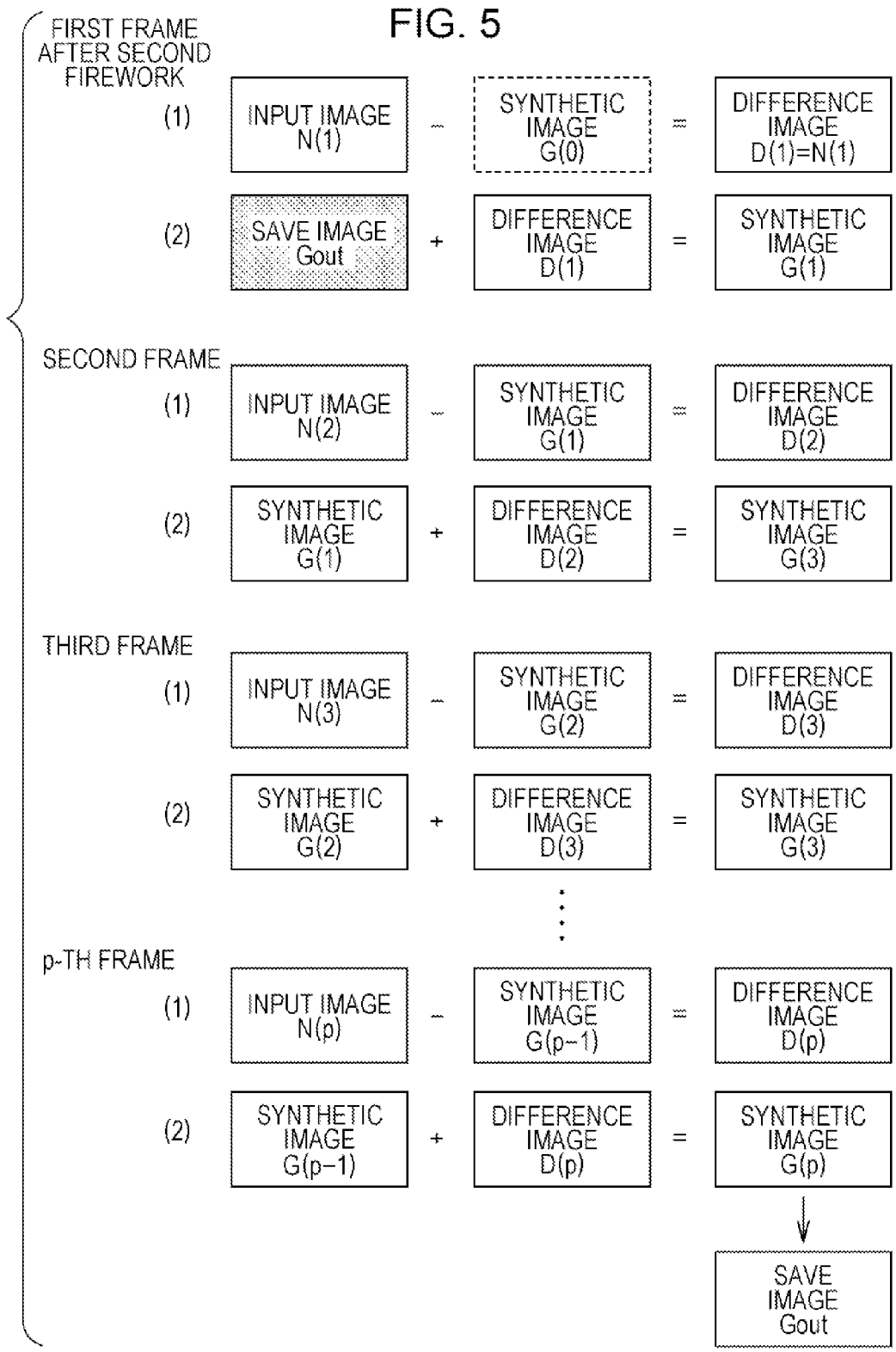
FIG. 5 is a diagram illustrating a multi-exposure photography process of sequence shooting.

Referring to FIG. 5, a description will be given of a multi-exposure photography process of the sequence shooting for photographing a plurality of fireworks, which are launched in succession, as a single image.

The process of photographing the first firework of the plurality of fireworks to be photographed is performed in a similar manner as the multi-exposure photography process of the single shooting which is described with reference to FIG. 3. However, when it is determined that it is difficult to detect the first firework as the detection target subject, the save image Gout, which is obtained by photographing the first firework through multiple exposure, is not output to the encoding processing unit 36 but is temporarily stored in the buffer 63. Thereafter, the maximum value $SIZE_{MAX}$ of the subject size, the frame count p, and the synthetic image G(p), which are temporarily stored in the buffer 63, are reset by the synthesis processing portion 62.

Subsequently, when the second firework is detected first from the input image, that is, when the input image N(1) of the first frame of the second firework is supplied to the synthesis processing portion 62, the synthesis processing portion 62, sets, as shown in FIG. 5, the input image N(1) as the difference image D(1) as it is. This process is similar to the process at the first frame of the first firework.

Next, the synthesis processing portion 62 adds the currently calculated difference image D(1) to the save image Gout which is the synthetic image of the first firework temporarily stored in the buffer 63, thereby generating the synthetic image G(1) which is synthesized until the second frame. That is, at the first frame in which the second firework is detected first, the synthesis processing portion 62 adds the calculated difference image D(1) to the save image Gout of the first firework.

The process in and after the second frame of the second firework is similar to the multi-exposure photography process of the single shooting mentioned above. Then, at the p-th frame of the second firework, if it is determined that it is difficult to detect the subject, the synthetic image G(p) of the p-th frame is temporarily stored as the save image Gout in the buffer 63. Thereafter, the maximum value $SIZE_{MAX}$ of the subject size, the frame count p, and the synthetic image G(p), which are used in the synthesis process of the second firework, are reset again.

Subsequently, when the third firework is detected first from the input image, that is, when the input image N(1) of the first frame of the third firework is supplied to the synthesis processing portion 62, the synthesis processing portion 62, sets the input image N(1) as the difference image D(1) as it is. This process is similar to the process at the first frame of the first firework.

Next, the synthesis processing portion 62 adds the currently calculated difference image D(1) to the save image Gout which is the synthetic image of the first and second fireworks temporarily stored in the buffer 63, thereby generating the synthetic image G(1) which is synthesized until the second frame. That is, at the first frame in which the third firework is detected first, the synthesis processing portion 62 adds the calculated difference image D(1) to the save image Gout of the second firework.

The process in and after the second frame of the third firework is similar to the process of the second firework mentioned above.

The multi-exposure photography process of the sequence shooting for photographing a plurality of fireworks, which are sequentially launched, as a single image is performed as described above.

Figure 6A:
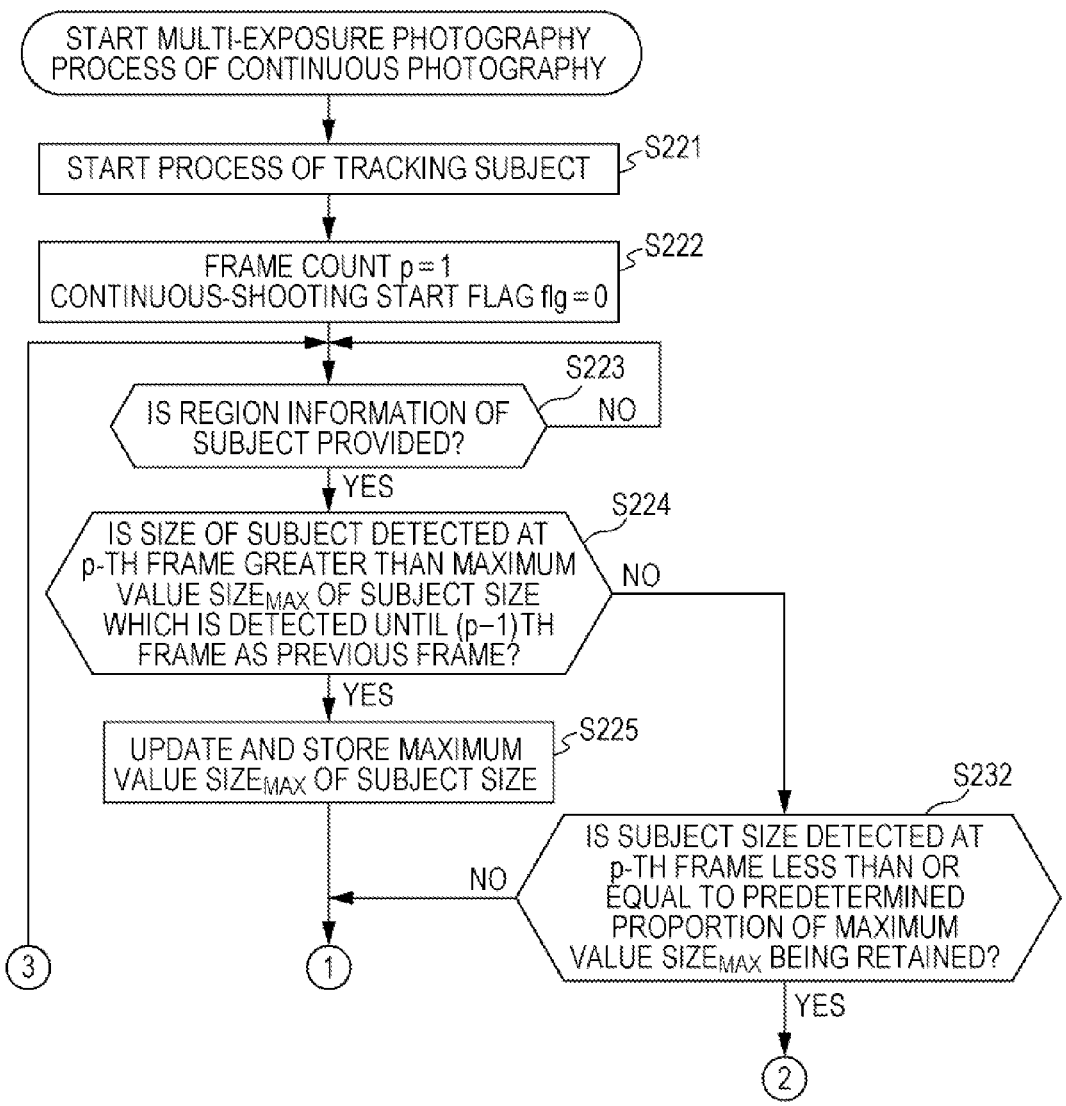
FIGS. 6A to 6B are flowcharts illustrating the multi-exposure photography process of the sequence shooting.
Figure 6B:
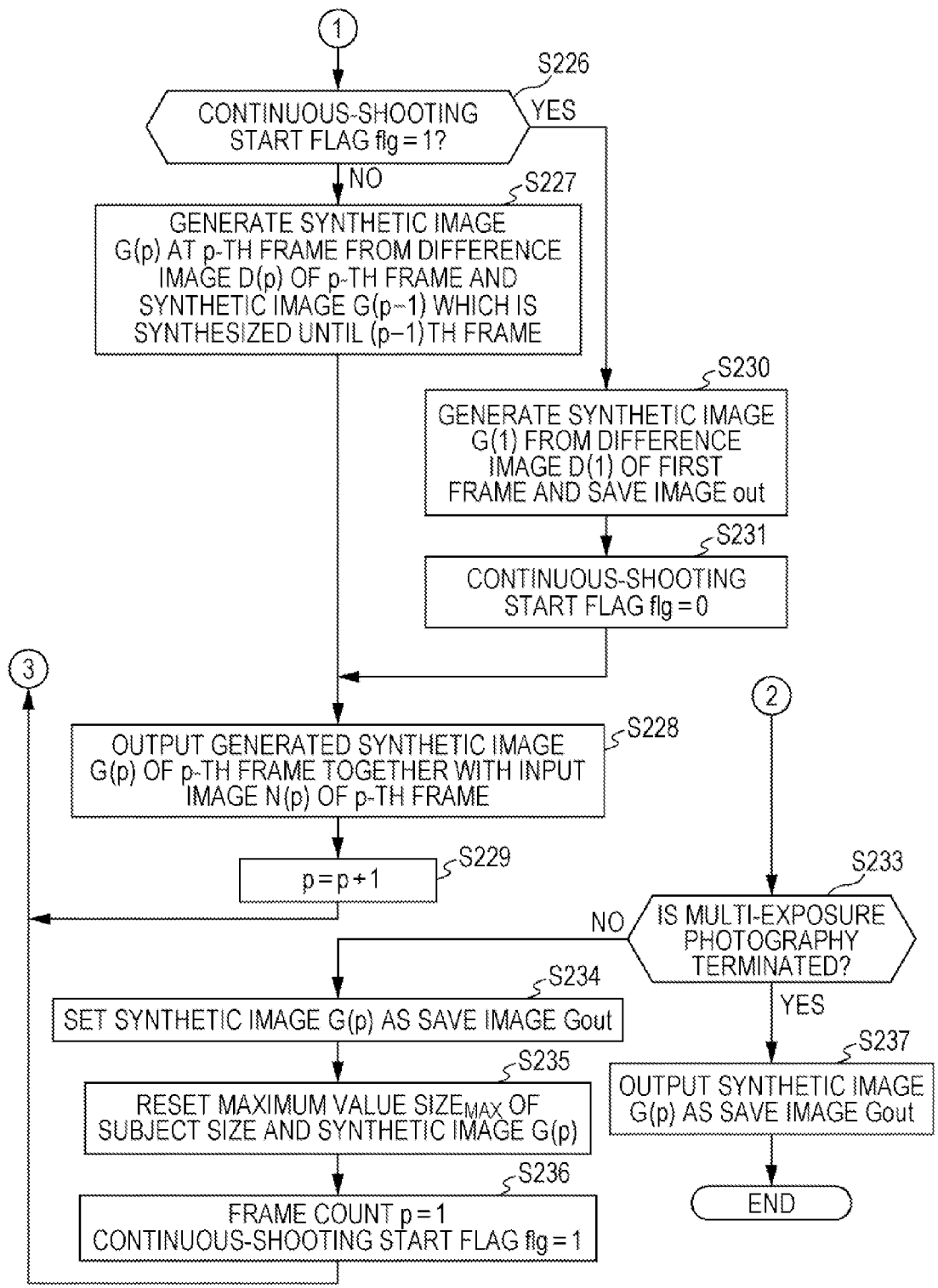

The multi-exposure photography process of the sequence shooting will be described with reference to the flowchart of FIG. 6. The timing of starting this process is set in a similar manner as, for example, that of FIG. 5. It should be noted that, in the multi-exposure photography process of the sequence shooting, a user may designate (input) how many fireworks the user photographs as a single image through multiple exposures before starting photographing.

First, in step S221, the subject detection portion of the image synthesis section 54 starts the subject tracking process of detecting the subject from the photographed image, which is supplied as an input image from the demosaic processing section 52 and is subjected to the demosaic process, and tracking the subject. The subject tracking process is continuously performed until the multi-exposure photography process ends.

In step S222, the synthesis processing portion 62 sets the frame count p to 1, and sets the continuous-shooting start flag flg to 0. The continuous-shooting start flag is defined as a flag that is set to 1 at the frame (first frame), in which the subject (firework) is one of the second and following fireworks and the subject is detected first, and is otherwise set to 0. Since the time point of the process of step S222 is before the first firework is detected, the continuous-shooting start flag flg is set to 0.

In step S223, the synthesis processing portion 62 determines whether or not the subject region information is supplied in a similar manner as step S203 of the single shooting mentioned above, and repeats the process until it is determined that the information is supplied.

Then, in step S223, if it is determined that the subject region information is supplied, that is, if the subject size is supplied from the subject detection portion 61, the process advances to step S224.

In step S224, the synthesis processing portion 62 determines whether the size of the subject detected in the input image N(p) of the p-th frame is greater than the maximum value $SIZE_{MAX}$ of the subject size detected in the range of the input image of the first frame to the input image N(p−1) of the (p−1)th frame which is previous to the p-th frame.

In step S224, if it is determined that the size of the subject detected in the input image N(p) of the p-th frame is greater than the maximum value $SIZE_{MAX}$ of the subject size detected in the range of the input image of the first frame to the input image N(p−1) of the (p−1)th frame which is previous to the p-th frame, the process advances to step S225. In step S225, the synthesis processing portion 62 updates the maximum value $SIZE_{MAX}$ of the subject size to the size of the subject detected in the input image N(p) of the p-th frame, and retains the value in the buffer 63.

In step S226, the synthesis processing portion 62 determines whether the continuous-shooting start flag flg is 1. In step S226, the case where it is determined that the continuous-shooting start flag flg is 1 will be described after description of the process of step S234 to S236. In the first process of step S226, the continuous-shooting start flag flg is set to 0 through the process of step S222 mentioned above, and thus it is determined that the continuous-shooting start flag flg is not 1.

In step S226, if it is determined that the continuous-shooting start flag flg is not 1, the process advances to step S227. In step S227, in a similar manner as step S206 of FIG. 4 mentioned above, the synthesis processing portion 62 generates the synthetic image G(p) at the p-th frame from the difference image D(p) of the p-th frame and the synthetic image G(p−1) which is synthesized until the (p−1)th frame.

Then, in step S228, the synthesis processing portion 62 outputs the generated synthetic image G(p) of the p-th frame to the display control unit 34 together with the input image N(p) of the p-th frame. As a result, the synthetic image G(p) of the p-th frame and the input image N(p) of the p-th frame are displayed on the display unit 35 so as to be, for example, horizontally arranged with the same size by the display control unit 34. With such a configuration, a user is able to view both the input image N(p), which is a through-the-lens image during the photographing, and the synthetic image G(p), which is an image obtained by the multi-exposure photography, at the same time.

After step S228, the process advances to step S229, the frame count p is incremented by 1, thereafter the process returns to step S223, and the following process thereof is repeated.

In contrast, in step S224 mentioned above, if it is determined that the size of the subject detected in the input image N(p) of the p-th frame is less than or equal to the maximum value $SIZE_{MAX}$ of the subject size detected in the range of the input image of the first frame to the input image N(p−1) of the (p−1)th frame which is previous to the p-th frame, the process advances to step S232. In step S232, it is determined whether the subject size detected in the input image N(p) of the p-th frame is less than or equal to a predetermined proportion of the retained maximum value $SIZE_{MAX}$ of the subject size. Then, in step S232, if it is determined that the subject size detected in the input image N(p) of the p-th frame is greater than the predetermined proportion of the maximum value $SIZE_{MAX}$ being retained, the process advances to step S226 mentioned above.

Figure 4:
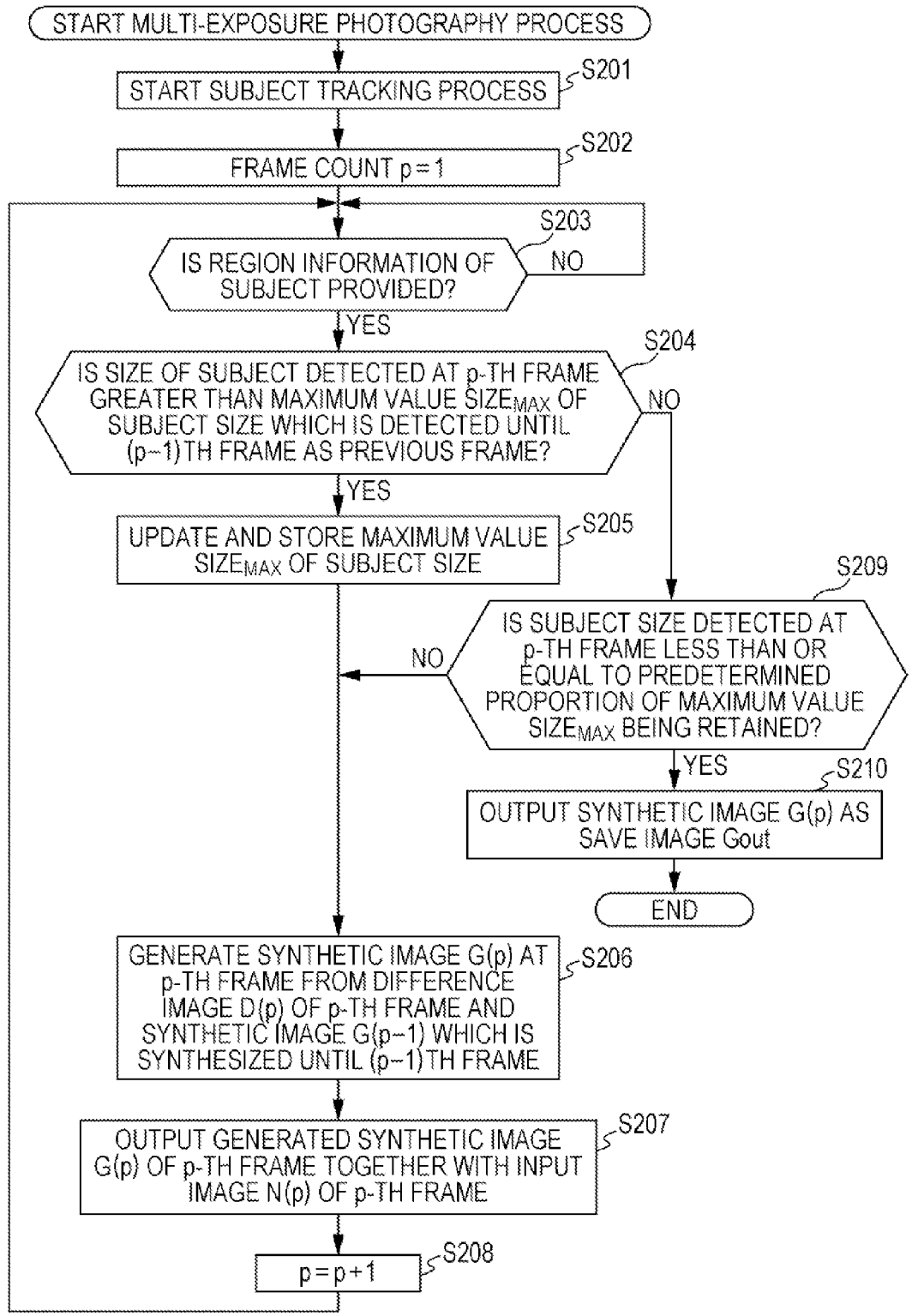
FIG. 4 is a flowchart illustrating a multi-exposure photography process.

Consequently, the process from step S221 to step S232 in the case where the continuous-shooting start flag flg is 0 excludes the process of step S230 and S231, and are the same as the process from step S201 to step S209 of FIG. 4 mentioned above.

In step S232, if it is determined that the subject size of the input image N(p) of the p-th frame is less than or equal to the predetermined proportion of the maximum value $SIZE_{MAX}$, the process advances to step S233. In step S232, the first determination that the subject size is less than or equal to the predetermined proportion of the maximum value $SIZE_{MAX}$ is made when it is difficult to detect the first firework.

In step S233, synthesis processing portion 62 determines whether to terminate the multi-exposure photography. For example, when a user designates (input) how many fireworks the user photographs through multiple exposures at the time of starting the process, the synthesis processing portion 62 determines whether to terminate the multi-exposure photography, on the basis of whether or not the number of photographed fireworks is equal to the designated number.

In step S233, if it is determined that the multi-exposure photography is not terminated, the process advances to step S234, and the synthesis processing portion 62 stores the synthetic image G(p) of the p-th frame as the save image Gout in the buffer 63. In the first process of step S234, the save image Gout corresponds to a multiple exposure image of the first firework. In the second process of step S234, the save image Gout corresponds to a multiple exposure image in which the first and second fireworks are subjected to multiple exposures.

Next, in step S235, the synthesis processing portion 62 resets the synthetic image G(p) and the maximum value $SIZE_{MAX}$ of the subject size retained in the buffer 63.

Then, in step S236, the synthesis processing portion 62 sets the frame count p to 1, sets the continuous-shooting start flag flg to 1, and returns the process to step S223. According to the process of step S236, for example, at the time point at which the synthesis process of the first firework, the second firework, of the fireworks is terminated, the continuous-shooting start flag flg is set to 1.

When the process returns to step S223, then it is determined again in step S223 whether the subject region information is supplied. Subsequently, for example, when the second firework is detected as a subject, the process advances to step S224.

After the process of steps S224 and S225, in step S226, it is determined whether the continuous-shooting start flag flg is 1. As describe above, the continuous-shooting start flag flg is 1 only at the frame (first frame) in which the subject (firework) is one of the second and following fireworks and the subject is detected first in the input image.

In step S226, if it is determined that the continuous-shooting start flag flg is 1, the process advances to step S230, and the synthesis processing portion 62 generates the synthetic image G(1) from the save image Gout and the difference image D(1) of the first frame.

For example, if the subject is the second firework, the synthesis processing portion 62 adds the difference image D(1) of the first frame of the second firework to the save image Gout which is the synthetic image of the first firework, thereby generating the synthetic image G(1) which is synthesized until the first frame of the second firework. Further, for example, if the subject is the third firework, the synthesis processing portion 62 adds the difference image D(1) of the first frame of the third firework to the save image Gout which is the synthetic image of the first and second fireworks, thereby generating the synthetic image G(1) which is synthesized until the first frame of the third firework.

Then, in step S231, the synthesis processing portion 62 sets the continuous-shooting start flag flg to 0 since the synthesis process for the first frame ends. Thereafter, the process advances to step S228, and the above-mentioned process is repeated.

As described above, the process of steps S230 and S231 corresponding to the process for the first frames of the second and following fireworks described with reference to FIG. 5 is performed only on the first single frame of each of the plurality of fireworks subjected to the continuous shooting. Otherwise, the process similar to the multi-exposure photography process of the single shooting is performed.

After the process of steps S223 to S233 is repeatedly performed on each of the plurality of fireworks subjected to the continuous shooting, in step S233, it is determined that the multi-exposure photography is terminated, and then the process advances to step S237.

In step S237, the synthesis processing portion 62 outputs the synthetic image G(p) of the p-th frame and the input image N(p) to the display control unit 34, and outputs the synthetic image G(p) of the p-th frame as the save image Gout to the encoding processing unit 36. Thereby, the synthetic image G(p) of the p-th frame and the input image N(p) are displayed on the display unit 35, the save image Gout as the photography result of the multi-exposure photography using the sequence shooting is stored in the storage unit 37, and the multi-exposure photography process ends.

In the above-mentioned multi-exposure photography process of the sequence shooting, the addition process that sequentially performs addition on the difference images obtained from the input images until it is difficult to detect the predetermined subject as a synthesis target after the subject is detected is repeated multiple times. Then, in each of the second and following addition processes among the addition processes which are repeated multiple times, the synthesis processing portion 62 adds the difference image, which is obtained from the input image including the subject detected first, to the save image Gout as the addition result in the previous addition process thereof, thereby generating the first synthetic image G(1).

In the multi-exposure photography process of the sequence shooting, if a user has only to change the photography mode to the multi-exposure photography mode and start photographing, the synthesis processing portion 62 determines whether to start or end the synthesis process of the input image on the basis of the detection result of the subject detection portion 61, thereby performing the multi-exposure photography process. Accordingly, it is not necessary for a user to determine and designate the shutter timing by themselves, and it is possible to obtain a multiple exposure image taken at appropriate shutter timing. Further, it is possible to perform photography without using tools such as a release cable and a blackout curtain which are necessary for existing multi-exposure photography. That is, according to the multi-exposure photography process of the image synthesis section 54, it is possible to easily obtain an image taken through multiple exposures. It should be noted that, in the above-mentioned example, the multi-exposure photography process of the sequence shooting was described through an example in which the plurality of fireworks sequentially launched is synthesized, but the synthesis target subject is not limited to the fireworks.

In step S233 of the multi-exposure photography process of the continuous shooting mentioned above, when the photography mode is changed from the multi-exposure photography mode to the normal photography mode, it may be determined that the multi-exposure photography ends. In such a case, in a state where the subject detection portion 61 still detects the fireworks, a user may perform an operation to change the photography mode. In this instance, the image synthesis section 54 continuously performs the addition process of steps S223 to S233 while the subject detection portion 61 detects the fireworks, and terminates the addition process when it is difficult to detect the subject.

In the above-mentioned embodiment, the subject detection portion 61 outputs only the size of the predetermined subject, which is detected, as a subject region information to the synthesis processing portion 62. However, the subject detection portion 61 may output, as region information, not only the subject size but also the position (the barycenter position or the center position) of the rectangular region surrounding the subject. In this case, the synthesis processing portion 62 does not sequentially perform frame addition on all the difference images obtained from the input images in and after the second frame, but may sequentially add the difference images only within the region of the subject, which is detected by the subject detection portion 61, to the input images of the first frames.

Further, when the addition is performed only in the subject region, the pixel values may be dramatically changed at the border between the addition region and the non-addition region, and thus there may be sense of incongruity in the image. For this reason, when the addition is performed only in the subject region, the synthesis processing portion 62 may perform a smoothing process such as α blending for gradually changing and adding the synthesis ratio α into the pixels of the ambient region of the addition region.

Further, the synthesis processing portion 62 may multiply a predetermined coefficient ρ and the difference image D(p) which is obtained from the input image N(p) of the p-th frame of each color component of R, G, and B supplied from the demosaic processing section 52, and add the difference image D'(p), to which the pixel values are weighted, to the synthetic image G(p−1) which is synthesized until the previous frame, thereby generating the synthetic image G(p) of the p-th frame.

That is, the synthesis processing portion 62 performs the following process on the input image N(p) of each color component of R, G, and B, whereby it is possible to generate the synthetic image G(p).

$$\text{Input Image } N(p) - \text{Synthetic Image } G(p-1) = \text{Difference Image } D(p) \quad (1)$$

$$\text{Difference Image } D(p) \times \text{Effect Coefficient } \rho = \text{Difference Image } D'(p) \quad (2)$$

$$\text{Synthetic Image } G(p-1) + \text{Difference Image } D'(p) = \text{Synthetic Image } G(p) \quad (3)$$

Here, the effect coefficient ρ is different for each color component of R, G, and B, and is a coefficient for changing colors of the detected subject. With such a configuration, for example, the color of the fireworks used as a detection target may be changed from red to blue.

Exemplary Configuration of Subject Detection Portion

Next, an exemplary configuration of the subject detection portion 61 of FIG. 2 will be described with reference to FIG. 7.

Figure 7:
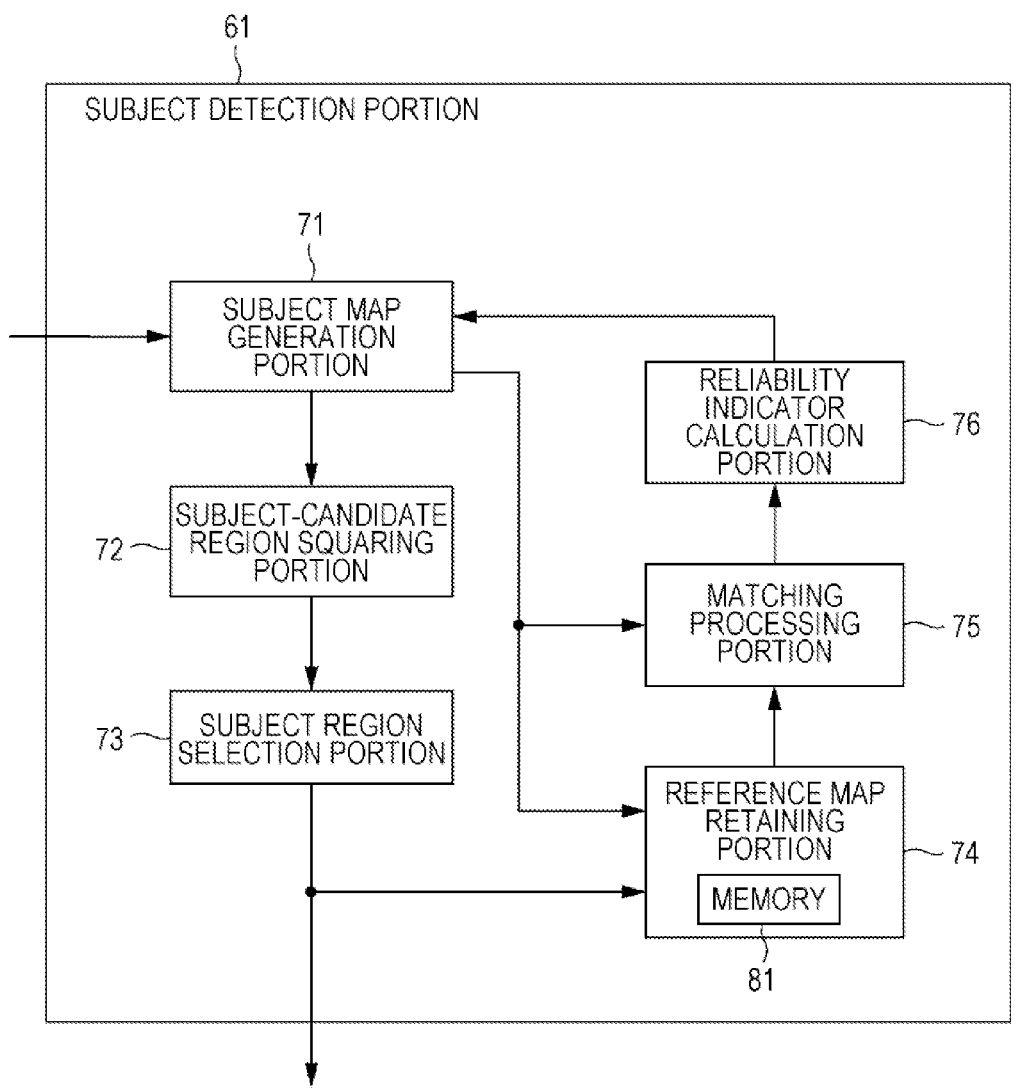
FIG. 7 is a block diagram illustrating an exemplary configuration of a subject detection portion.

The subject detection portion 61 in FIG. 7 includes a subject map generation portion 71, a subject-candidate region squaring portion 72, a subject region selection portion 73, a reference map retaining portion 74, a matching processing portion 75, and a reliability indicator calculation portion 76.

The plural input images, which are captured successively in terms of time by the imager 32 of FIG. 1 and are processed by the preprocessing section 51 to the YC generation section 55, are sequentially supplied to the subject map generation portion 71.

The subject map generation portion 71 supplies and generates a feature map representing feature amounts of a feature in the respective regions of the input image for each predetermined feature such as luminance or color of pixels of the input image, and supplies the feature map to the reference map retaining portion 74 and the matching processing portion 75. Further, on the basis of the generated feature maps and the reliability indicators supplied from the reliability indicator calculation portion 76, the subject map generation portion 71 generates a subject map representing similarities of the subject in the respective regions of the input image.

Specifically, the subject map generation portion 71 extracts band components from the feature map generated for each feature so as to generate a band feature map for each of the plural bands (spatial frequency bands) different from each other, and supplies the band feature maps to the reference map retaining portion 74 and the matching processing portion 75.

Each band feature map is a feature map representing a specific band component of the feature amount of the feature in the respective regions of the input image. In other words, the band feature map represents the feature amount of the feature included in the specific band component of the input image.

Further, the subject map generation portion 71 selects any one of the band feature maps of the respective bands, on the basis of the reliability indicators, each of which is supplied from the reliability indicator calculation portion 76, for each position corresponding to each pixel of the input image, from the generated band feature maps of the respective bands of each feature.

Hereinafter, in the feature maps (which include the band feature maps and the synthetic feature maps to be described later) and the subject map, the regions (positions) corresponding to the pixels of the input image are simply referred to as pixels.

The subject map generation portion 71 performs synthesis of the feature amounts, each of which is selected for each pixel from the band feature map of each band for each feature, on all pixels for each feature amount. Thereby, the subject map generation portion 71 generates synthetic feature maps, and supplies the synthetic feature maps to the reference map retaining portion 74 and the matching processing portion 75.

Each synthetic feature map is a feature map representing subject similarity, which is obtained from the feature amounts of each feature, at the respective regions of the input image. In addition, the subject described herein is defined as a subject, for which it is estimated that a user focuses thereon, on an input image, that is, a subject for which it is estimated that a user has an interest therein when the user views the input image. Accordingly, the subject is not limited to a person.

Further, the subject map generation portion 71 selects one synthetic feature amount of any of the synthetic feature maps, on the basis of the reliability indicators each of which is supplied from the reliability indicator calculation portion 76, for each pixel, from the synthetic feature map of each feature. Then, the subject map generation portion 71 synthesizes the selected synthetic feature amounts for all pixels, thereby generating the subject map. The subject map generation portion 71 supplies the generated subject map to the subject-candidate region squaring portion 72. The information (values) of the respective regions (pixels) of the subject map that can be obtained as described above represents similarities to the subject at the respective regions of the input image.

The reliability indicator supplied from the reliability indicator calculation portion 76 will be described in detail later.

The subject-candidate region squaring portion 72 finds a region as a candidate of the subject, that is, a rectangular region (hereinafter referred to as a subject-candidate region) including a region similar to the subject, in the subject map generated from the subject map generation portion 71, and generates coordinate information representing the position of the rectangular region.

Further, the subject-candidate region squaring portion 72 generates region information representing feature amounts of the specific feature belonging to the subject-candidate regions on the basis of the subject map. Then, the subject-candidate region squaring portion 72 supplies the coordinate information and the region information of the subject-candidate regions to the subject region selection portion 73.

The subject region selection portion 73 selects one of the subject-candidate regions as a tracking target region (hereinafter referred to as a subject region) including the subject on the basis of the coordinate information and the region information supplied from the subject-candidate region squaring portion 72. The subject region selection portion 73 supplies the coordinate information representing the position of the subject region to the control unit 39 and the reference map retaining portion 74.

The subject region represented by the coordinate information which is output from the subject region selection portion 73 is a region most similar to the tracking target subject in the subject map. Specifically, in the subject detection portion 61, an optional region, for which it is estimated that a user focuses thereon, similar to the subject on the subject map is treated as a candidate (the subject-candidate region) of the subject region as the tracking target designated by a user. In addition, the region most similar to the tracking target subject is selected as the subject region from the inside of the subject-candidate region, and the region of the input image at the same position as the subject region on the subject map is specified as the region including the tracking target subject.

It should be noted that hereinafter the region on the input image at the same position as the subject region on the subject map is simply referred to as the subject region. Further, the tracking target subject is not limited to one designated by the user. However, for example, among the subject-candidate regions at the first frame, a region with a largest area, that is, a region which is highest in the evaluation of the subject similarity is treated as the subject region, and the subject included in the subject region may be treated as the tracking target.

The reference map retaining portion 74 includes a memory 81, generates reference maps on the basis of the band feature maps and the synthetic feature maps supplied from the subject map generation portion 71 and the coordinate information supplied from the subject region selection portion 73, and stores the reference maps in the memory 81.

Specifically, the reference map retaining portion 74 cuts out the region at the same position as the subject region in each band feature map, and sets the cutout region as the reference map of the band feature map. Likewise, the reference map retaining portion 74 cuts out the region at the same position as the subject region in each synthetic feature map, and sets the cutout region as the reference map of the synthetic feature map.

Hereinafter, the reference maps of the band feature map and the synthetic feature map are respectively referred to as the band reference map and the synthetic reference map.

The matching processing portion 75 performs the matching process on the basis of the reference map stored in the memory 81, and searches for the region, which is most highly correlated with (most similar to) the reference map, from the band feature map and the synthetic feature map which are supplied from the subject map generation portion 71.

That is, in the band feature map of the current frame as a processing target, the region, which is most similar to the band reference map of the frame previous to the current frame, is searched. Further, in the synthetic feature map of the current frame, the region, which is most similar to the synthetic reference map of the previous frame, is searched.

Hereinafter, in the band feature map and synthetic feature map of the current frame, the regions, which are respectively most similar to the band reference map and the synthetic reference map of the previous frame, are referred to as the most similar regions.

The matching processing portion 75 supplies the result of the matching process performed on the band feature map and the synthetic feature map to the reliability indicator calculation portion 76.

The reliability indicator calculation portion 76 calculates, on the basis of the result of the matching process obtained from the matching processing portion 75, the degrees of distribution of the feature amounts in the near-field regions including the most similar regions on the band feature maps and the synthetic feature maps of the current frame.

The reliability indicator calculation portion 76 calculates the reliability indicators as indicators indicating that the most similar regions on the band feature maps of the current frame include the subject on the basis of the degree of distribution of the feature amounts in the near-field regions including the most similar regions on the band feature maps of the current frame, and supplies the reliability indicators to the subject map generation portion 71.

Further, the reliability indicator calculation portion 76 calculates the reliability indicators as indicators indicating that the most similar regions on the synthetic feature maps of the current frame includes the subject on the basis of the degree of distribution of the feature amounts in the near-field regions including the most similar regions on the synthetic feature maps of the current frame, and supplies the reliability indicators to the subject map generation portion 71.

Hereinafter, arbitrarily, each reliability indicator for the band feature maps of the current frame is referred to as a band reliability indicator, and each reliability indicator for the synthetic feature maps is referred to as a synthetic reliability indicator.

Exemplary Configuration of Subject Map Generation Portion

Next, an exemplary configuration of the subject map generation portion 71 of FIG. 7 will be described in detail with reference to FIG. 8.

The subject map generation portion 71 includes a feature map generation portion 111, a band-feature map generation portion 112, a band-feature map synthesis portion 113, and a synthetic-feature map synthesis portion 114.

The feature map generation portion 111 extracts the feature amounts of the features such as luminance and color from the respective regions of the input image so as to generate the feature maps representing the extracted feature amounts, and supplies the feature maps to the band-feature map generation portion 112.

The band-feature map generation portion 112 extracts specific band components of each feature map, which is obtained from the feature map generation portion 111, from the feature map so as to generate the band feature maps, and supplies the band feature maps to the band-feature map synthesis portion 113, the reference map retaining portion 74, and the matching processing portion 75. The band feature map is generated for each band in each feature.

The band-feature map synthesis portion 113 selects one feature amount of any of the band feature maps on the basis of the band reliability indicators supplied from the reliability indicator calculation portion 76, for each pixel, from the band feature maps corresponding to each feature amount supplied from the band-feature map generation portion 112. The band-feature map synthesis portion 113 generates the synthetic feature maps by synthesizing the feature amounts, each of which is selected for each pixel, for all pixels (the selected feature amounts are employed as the feature amounts of the respective pixels). Consequently, the band feature maps with the same feature are synthesized on the basis of the band reliability indicator, and are formed as a synthetic feature map for each feature.

The band-feature map synthesis portion 113 supplies the synthetic feature maps, each of which is generated for each feature, to the synthetic-feature map synthesis portion 114, the reference map retaining portion 74, and the matching processing portion 75.

The synthetic-feature map synthesis portion 114 selects one feature amount of any of the synthetic feature maps on the basis of the synthetic reliability indicators supplied from the reliability indicator calculation portion 76, for each pixel, from the synthetic feature maps supplied from the band-feature map synthesis portion 113. The synthetic-feature map synthesis portion 114 generates the subject map by synthesizing the feature amounts, each of which is selected for each pixel, for all pixels (the selected feature amounts are employed as the feature amounts of the respective pixels).

Consequently, synthetic-feature map synthesis portion 114 supplies the generated subject map to the subject-candidate region squaring portion 72.

Here, the detailed configurations of the band-feature map synthesis portion 113 and the synthetic-feature map synthesis portion 114 of FIG. 8 will be described with reference to FIGS. 9 and 10.

Exemplary Configuration of Band-Feature Map Synthesis Portion

Figure 8:
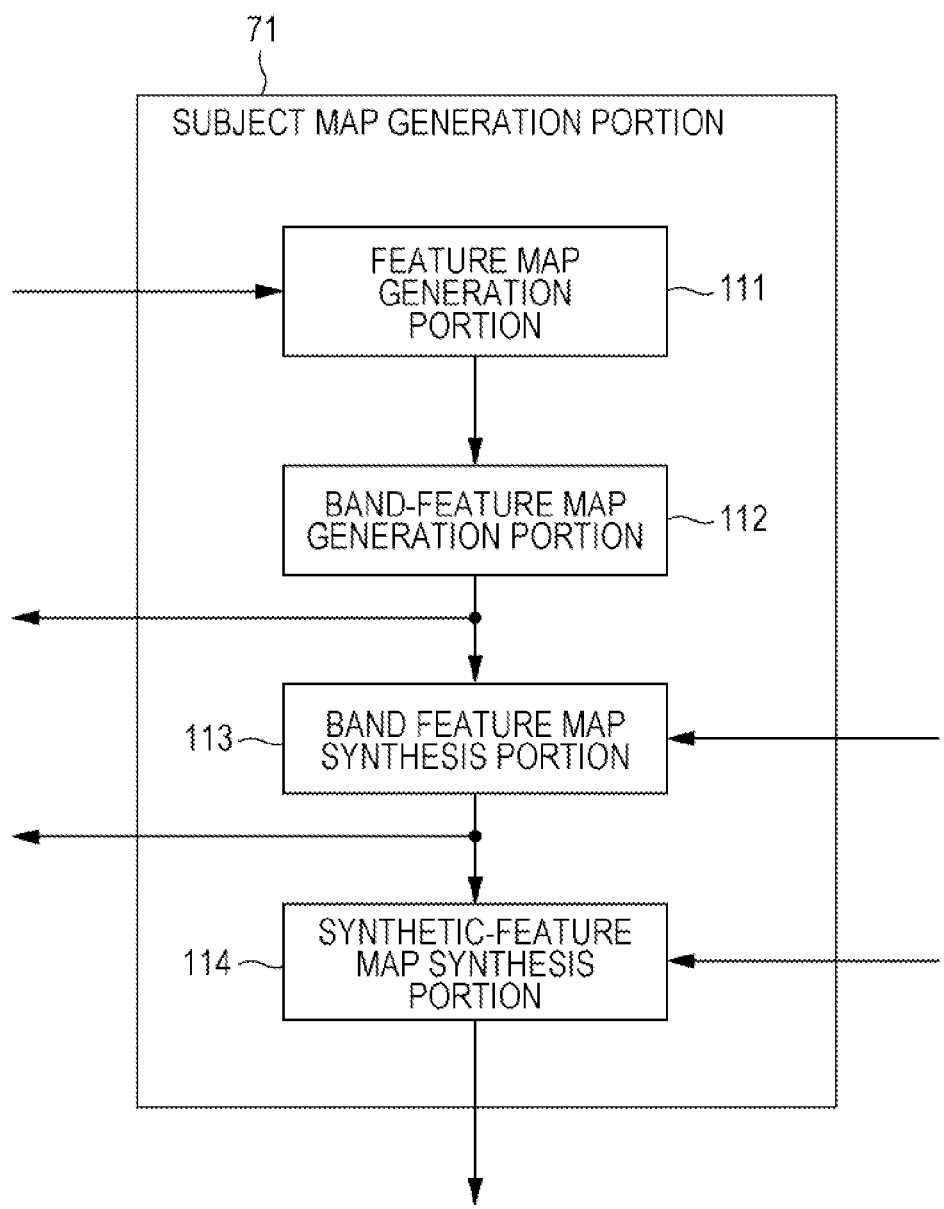
FIG. 8 is a block diagram illustrating an exemplary configuration of a subject map generation portion.
Figure 9:
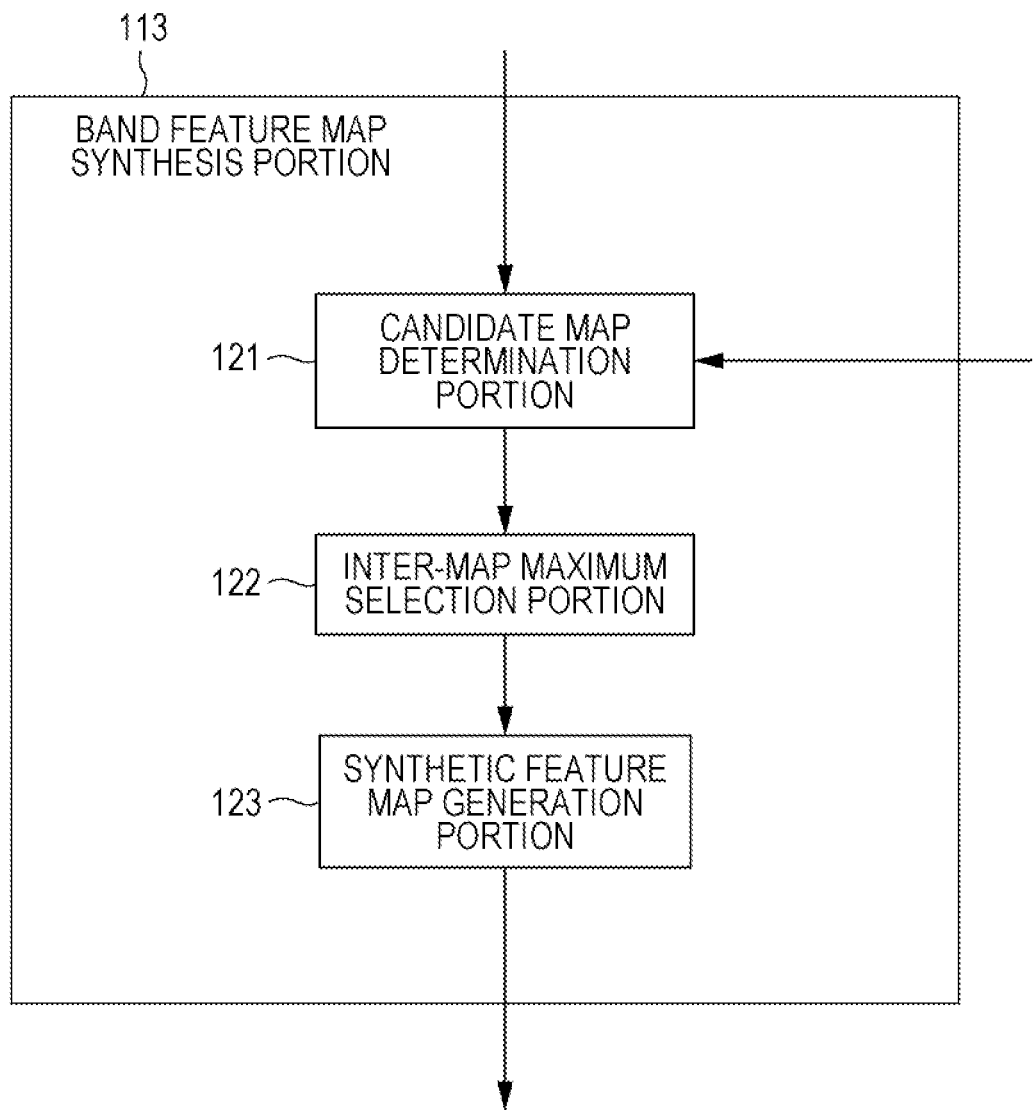
FIG. 9 is a block diagram illustrating an exemplary configuration of a band-feature map synthesis portion.

More specifically, the band-feature map synthesis portion 113 of FIG. 8 is configured as shown in FIG. 9.

That is, the band-feature map synthesis portion 113 includes a candidate map determination portion 121, an inter-map maximum selection portion 122, and a synthetic feature map generation portion 123.

The candidate map determination portion 121 determines candidate maps as candidates to be synthesized with the synthetic feature maps on the basis of the band reliability indicators, which are supplied from the reliability indicator calculation portion 76, from the band feature maps of the respective feature amounts supplied from the band-feature map generation portion 112. The candidate map determination portion 121 supplies the determined candidate maps (hereinafter referred to as band candidate maps) to the inter-map maximum selection portion 122.

The inter-map maximum selection portion 122 selects the maximum feature amount among the band candidate maps, for each pixel, from the band candidate maps supplied from the candidate map determination portion 121, and performs this selection on all pixels.

The synthetic feature map generation portion 123 generates the synthetic feature maps by synthesizing the maximum feature amounts, each of which is selected for each pixel among the band candidate maps by the inter-map maximum selection portion 122, for all pixels (the maximum feature amounts are employed as the feature amounts of the respective pixels). Then, the synthetic feature map generation portion 123 supplies the synthetic feature maps to the synthetic-feature map synthesis portion 114, the reference map retaining portion 74, and the matching processing portion 75.

Exemplary Configuration of Synthetic-Feature Map Synthesis Portion

Figure 10:
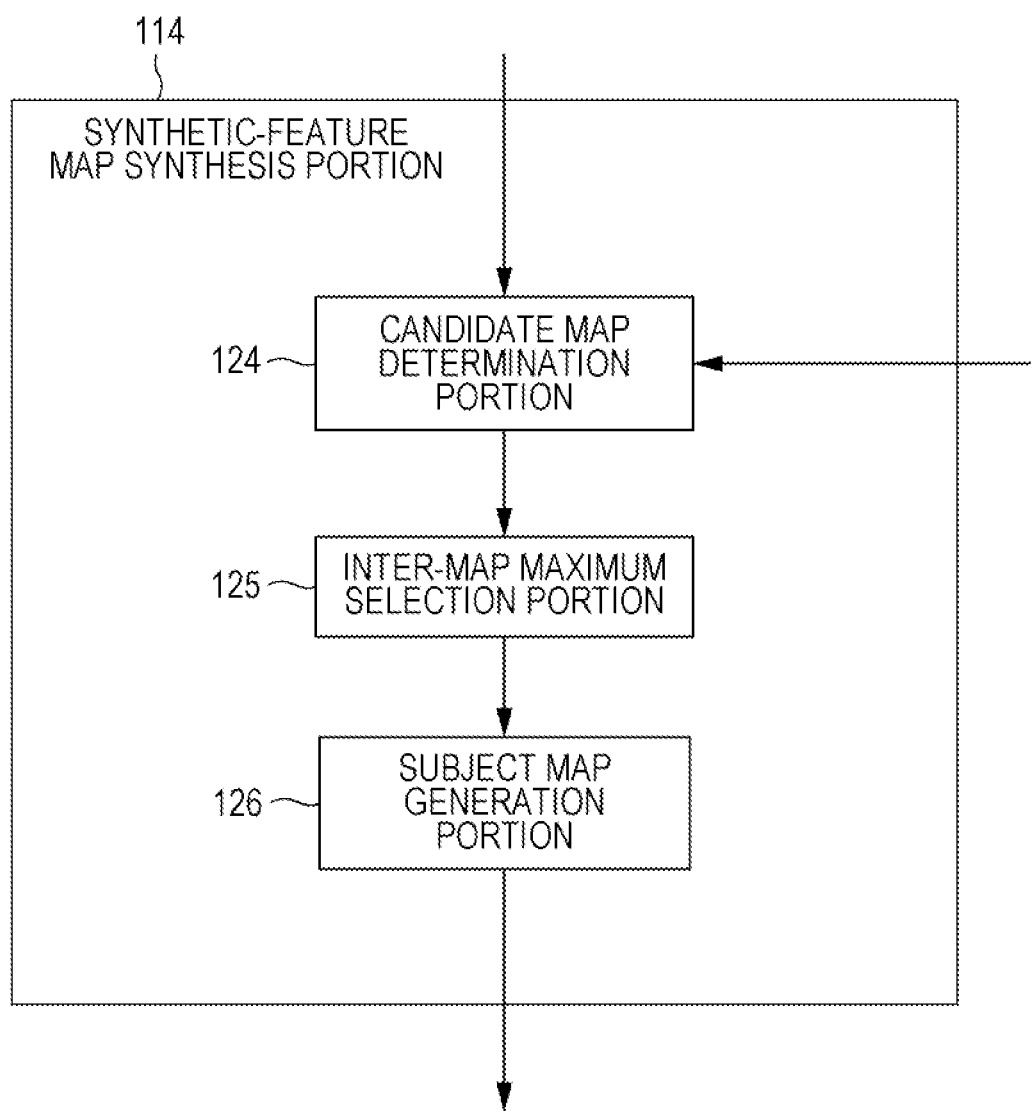
FIG. 10 is a block diagram illustrating an exemplary configuration of a synthetic-feature map synthesis portion.

More specifically, the synthetic-feature map synthesis portion 114 of FIG. 8 is configured as shown in FIG. 10.

That is, the synthetic-feature map synthesis portion 114 includes a candidate map determination portion 124, an inter-map maximum selection portion 125, and a subject map generation portion 126.

The candidate map determination portion 124 determines candidate maps as candidates to be synthesized with the subject map on the basis of the synthetic reliability indicators, which are supplied from the reliability indicator calculation portion 76, from the synthetic feature maps supplied from the band-feature map synthesis portion 113. The candidate map determination portion 124 supplies the determined candidate maps (hereinafter referred to as synthetic candidate maps) to the inter-map maximum selection portion 125.

The inter-map maximum selection portion 125 selects the maximum feature amount among the synthetic candidate maps, for each pixel, from the synthetic candidate maps supplied from the candidate map determination portion 124, and performs this selection on all pixels.

The subject map generation portion 126 generates the subject map by synthesizing the maximum feature amounts, each of which is selected from among the synthetic candidate maps by the inter-map maximum selection portion 125 for each pixel, for all pixels (the maximum feature amounts are employed as the feature amounts of the respective pixels). Then, the subject map generation portion 126 supplies the subject map to the subject-candidate region squaring portion 72.

Exemplary Configuration of Subject-Candidate Region Squaring Portion

Figure 11:
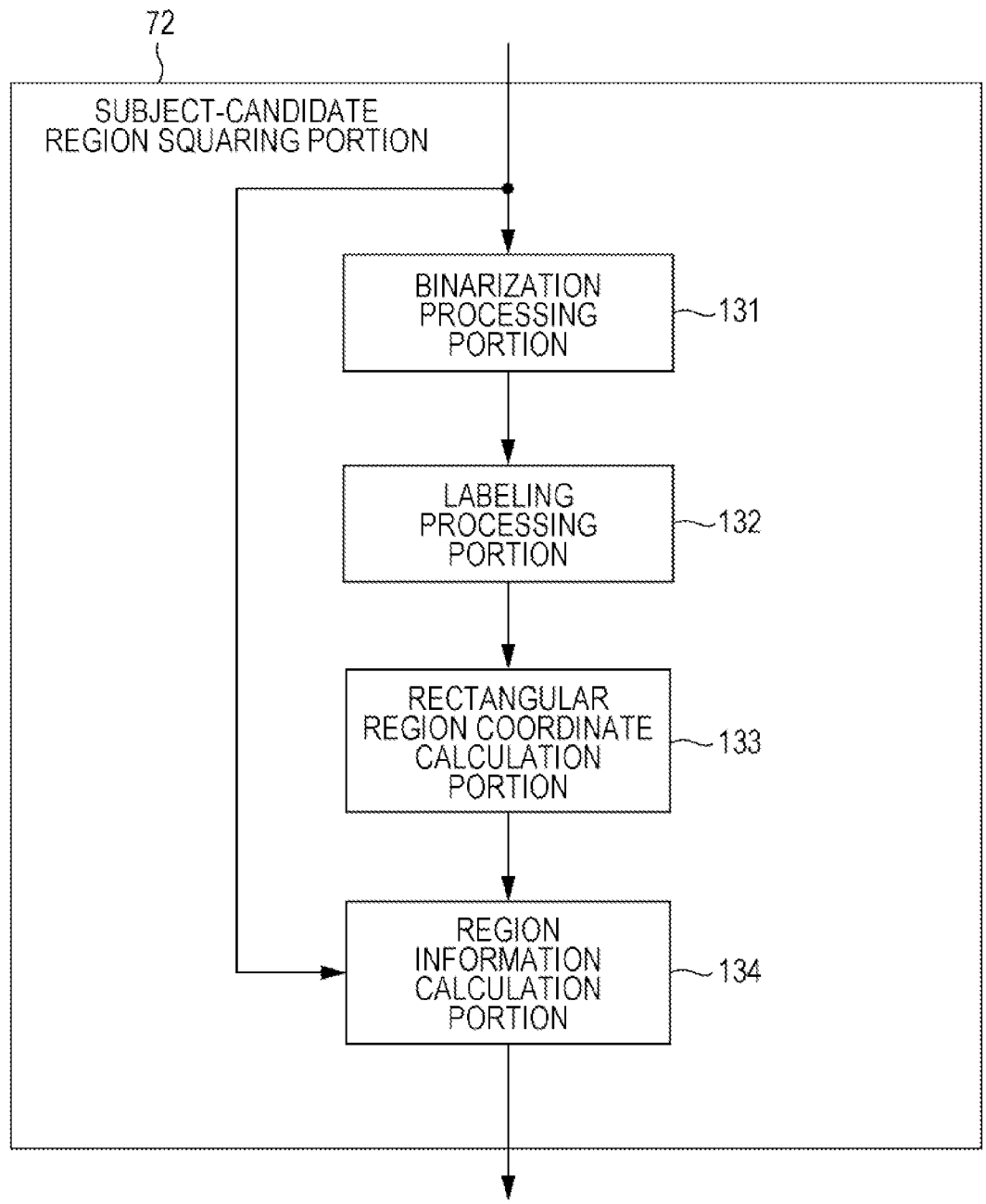
FIG. 11 is a block diagram illustrating an exemplary configuration of a subject-candidate region squaring portion.

Next, an exemplary configuration of the subject-candidate region squaring portion 72 of FIG. 7 will be described in detail with reference to FIG. 11.

The subject-candidate region squaring portion 72 includes a binarization processing portion 131, labeling processing portion 132, a rectangular region coordinate calculation portion 133, and a region information calculation portion 134.

The binarization processing portion 131 binarizes the information corresponding to each pixel of the input image into either one 0 or 1 on the basis of a predetermined threshold value in the subject map supplied from the synthetic-feature map synthesis portion 114 of the subject map generation portion 71. Then, the binarization processing portion 131 supplies the binarized information to the labeling processing portion 132.

Hereinafter, the information (value) corresponding to each region (pixel) of each of the subject map, the feature map, the band feature map, and the synthetic feature map is simply referred to as a pixel value.

For example, the pixel value of each pixel of the subject map represent the subject similarity of each pixel (the region) of the input image which is at the same position of the pixel of the subject map. In particular, in the binarized subject map, the pixel with a pixel value of "1" is a region similar to the subject, and the pixel with a pixel value of "0" is a region (for example, a background region) which is not the subject. Consequently, the binarized subject map represents the regions similar to the subject in the input image.

The labeling processing portion 132 sets regions, which are adjacent to each other in the binarized subject map supplied from the binarization processing portion 131 and are formed of the pixels with the pixel value of "1", as connected regions, and labels the respective connected regions. Each connected region is a region as a candidate of the subject region. For example, in the labeling, numbers are assigned to the connected regions so as to specify the connected regions. The labeling processing portion 132 supplies the labeled subject map to the rectangular region coordinate calculation portion 133.

The rectangular region coordinate calculation portion 133 sets a rectangular region including (surrounding) each connected region as a subject-candidate region in the subject map supplied from the labeling processing portion 132. Then, the rectangular region coordinate calculation portion 133 supplies the coordinate information representing the positions of the respective subject-candidate regions to the region information calculation portion 134.

The region information calculation portion 134 generates region information for each subject-candidate region on the basis of the coordinate information supplied from the rectangular region coordinate calculation portion 133 and the subject map supplied from the synthetic-feature map synthesis portion 114. Then, the region information calculation portion 134 supplies the coordinate information and the region information of the respective subject-candidate regions to the subject region selection portion 73.

Exemplary Configuration of Subject Region Selection Portion

Figure 12:
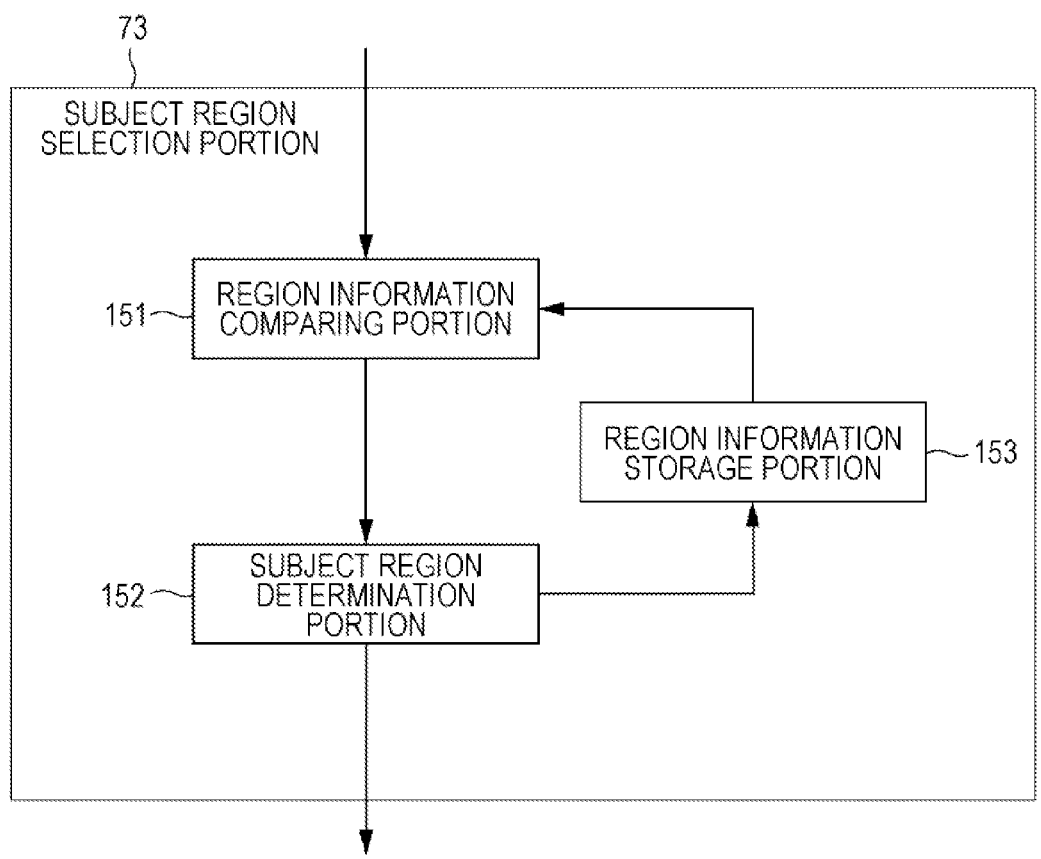
FIG. 12 is a block diagram illustrating an exemplary configuration of a subject region selection portion.

Next, an exemplary configuration of the subject region selection portion 73 of FIG. 7 will be described with reference to FIG. 12.

The subject region selection portion 73 includes a region information comparing portion 151, a subject region determination portion 152, and a region information storage portion 153.

The region information comparing portion 151 compares the region information of the respective subject-candidate regions, which is supplied from the region information calculation portion 134, at the current frame as the processing target with the region information of the subject region, which is stored in the region information storage portion 153, at the frame previous to the current frame. Further, the region information comparing portion 151 supplies the comparing result of the region information on the respective subject-candidate regions and the coordinate information supplied from the region information calculation portion 134 to the subject region determination portion 152.

The subject region determination portion 152 sets, on the basis of the comparing result supplied from the region information comparing portion 151, the subject-candidate region, which has region information closest to the region information of the subject region of the previous frame, among the subject-candidate regions of the current frame as the subject region of the current frame. That is, when the region information is set as an indicator, the subject-candidate region, which is most highly correlated with (most similar to) the subject region of the previous frame, is treated as the subject region of the current frame.

The subject region determination portion 152 supplies the coordinate information of the determined subject region of the current frame to the control unit 39 and the reference map retaining portion 74. In addition, the subject region determination portion 152 supplies the region information of the subject region of the current frame to the region information storage portion 153. The region information storage portion 153 stores the region information, which is supplied from the subject region determination portion 152, and supplies the stored region information to the region information comparing portion 151.

Exemplary Configuration of Subject Region Selection Portion

Figure 13:
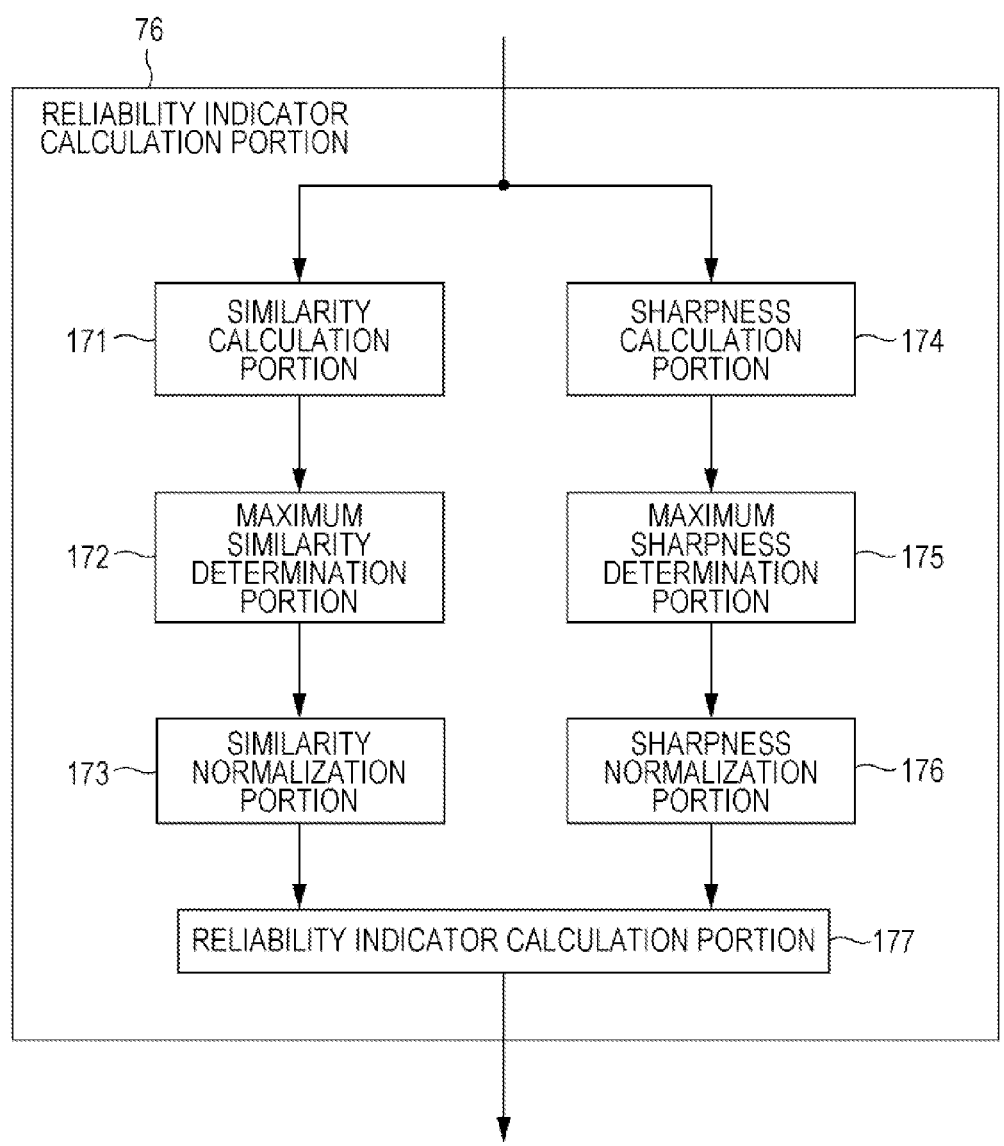
FIG. 13 is a block diagram illustrating an exemplary configuration of a reliability indicator calculation portion.

Next, an exemplary configuration of the reliability indicator calculation portion 76 of FIG. 7 will be described with reference to FIG. 13.

The reliability indicator calculation portion 76 includes a similarity calculation portion 171, a maximum similarity determination portion 172, a similarity normalization portion 173, a sharpness calculation portion 174, a maximum sharpness determination portion 175, a sharpness normalization portion 176, and a reliability indicator calculation portion 177.

The similarity calculation portion 171 calculates, on the basis of the result of the matching process supplied from the matching processing portion 75, the similarities between the reference map of the previous frame and the most similar regions on the respective feature maps (the band feature map and the synthetic feature map) of the current frame, and supplies the similarities to the maximum similarity determination portion 172.

It should be noted that the similarity between each most similar region and the reference map is one of the values indicating the degrees of distribution of the feature amounts in the near-field regions including the most similar regions on the feature maps. However, the calculation of the similarity will be described in detail later with reference to FIG. 20.

The maximum similarity determination portion 172 determines the maximum similarity, at which the similarity is the maximum, on the basis of the similarities of the respective feature maps supplied from the similarity calculation portion 171, and supplies the maximum similarity to the similarity normalization portion 173 together with the similarities of the respective feature map.

The similarity normalization portion 173 normalizes, on the basis of the maximum similarity supplied from the maximum similarity determination portion 172, the similarities of the respective feature maps, and supplies the normalized similarities to the reliability indicator calculation portion 177.

The sharpness calculation portion 174 calculates, on the basis of the matching result supplied from the matching processing portion 75, the sharpness levels of the respective feature maps of the current frame, and supplies the sharpness levels to the maximum sharpness determination portion 175.

It should be noted that the sharpness level of each feature map is one of values indicating the degree of distribution of the feature amounts in the near-field regions including the most similar regions on the feature maps. However, the calculation of the sharpness level will be described in detail later with reference to FIG. 20.

The maximum sharpness determination portion 175 determines the maximum sharpness level, at which the similarity is the maximum, on the basis of the sharpness levels of the respective feature maps supplied from the sharpness calculation portion 174, and supplies the maximum sharpness level to the sharpness normalization portion 176 together with the sharpness levels of the respective feature maps.

The sharpness normalization portion 176 normalizes, on the basis of the maximum sharpness level supplied from the maximum sharpness determination portion 175, the sharpness levels of the respective feature maps, and supplies the normalized sharpness levels to the reliability indicator calculation portion 177.

The reliability indicator calculation portion 177 calculates the reliability indicators of the respective feature maps on the basis of the normalized similarities of the feature maps supplied from the similarity normalization portion 173 and the normalized sharpness levels of the feature maps supplied from the sharpness normalization portion 176, and supplies the calculated reliability indicators to the subject map generation portion 71.

Description of Subject Tracking Process

However, when a user wants to take an image through the image processing device 11, the user operates the user interface 41 so as to issue an instruction to start the image capturing process. Then, the control unit 39 operates the respective units of the image processing device 11 in response to the control signal which is supplied from the user interface 41 through the interface control unit 40.

For example, the control unit 39 allows the imager 32 to capture the input image, and simultaneously allows the digital signal processing unit 33 to perform various kinds of processing such as the preprocess, thereby obtaining the input image from the digital signal processing unit 33. Then, the control unit 39 sequentially supplies the acquired input images of the respective frames through the interface control unit 40 to the user interface 41 so as to display the input images.

With such a configuration, a user determines a composition while viewing the input images displayed as so-called preview images on the user interface 41, and operates the user interface 41 so as to be able to issue an instruction to capture a still image or the like.

At this time, the user operates a button serving as the user interface 41, thereby applying the operation mode of the image processing device 11 to the subject tracking process mode in which the outline surrounding the tracking target subject is displayed. When the instruction to apply the operation mode thereof to the subject tracking process mode is received and the user designates a predetermined region on the input image as the subject region, the subject detection portion 61 starts the subject tracking process of tracking the subject in the designated region, and specifies the subject region in each frame of the input image.

Then, when receiving the supply of the coordinate information representing the position of the subject region from the subject detection portion 61, on the basis of the coordinate information, the control unit 39 supplies the outline indicating the subject region to the user interface 41 so as to display the outline. In such a manner, the outline of the subject region is displayed, together with the input image, on the user interface 41.

Next, the subject tracking process performed by the subject detection portion 61 will be described with reference to the flowchart of FIG. 14.

In step S11, the subject map generation portion 71 performs the subject map generation process so as to generate the subject map, and supplies the subject map to the subject-candidate region squaring portion 72.

Figure 15:
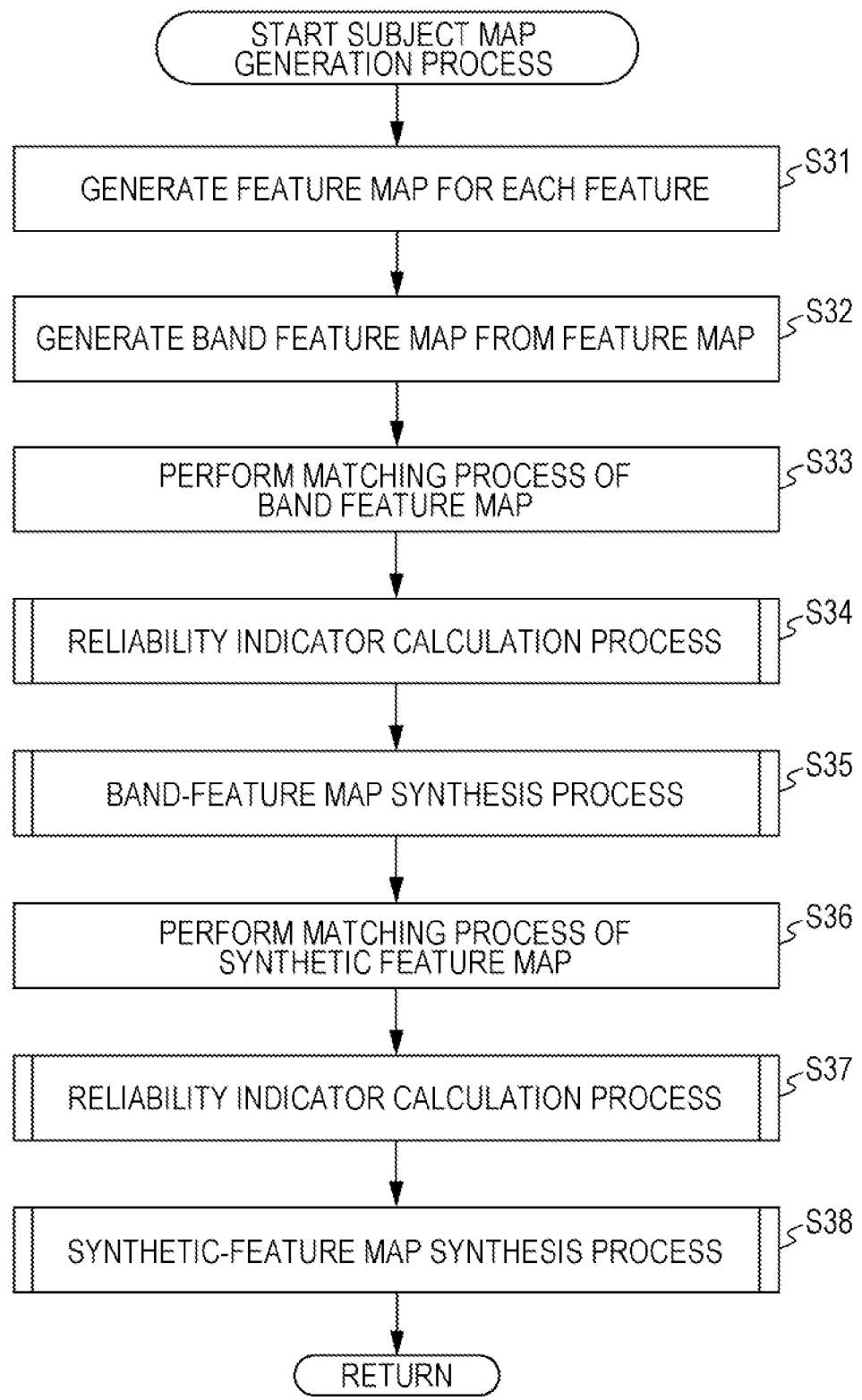
FIG. 15 is a flowchart illustrating a subject map generation process.

Hereinafter, the subject map generation process corresponding to the process of step S11 will be described in detail with reference to FIGS. 15 to 25. FIG. 15 is a flowchart illustrating the subject map generation process.

In step S31 of FIG. 15, the feature map generation portion 111 of the subject map generation portion 71 generates the feature map for each feature such as luminance or color from the input image of the current frame as the processing target, and supplies the feature map to the band-feature map generation portion 112.

Figure 16:
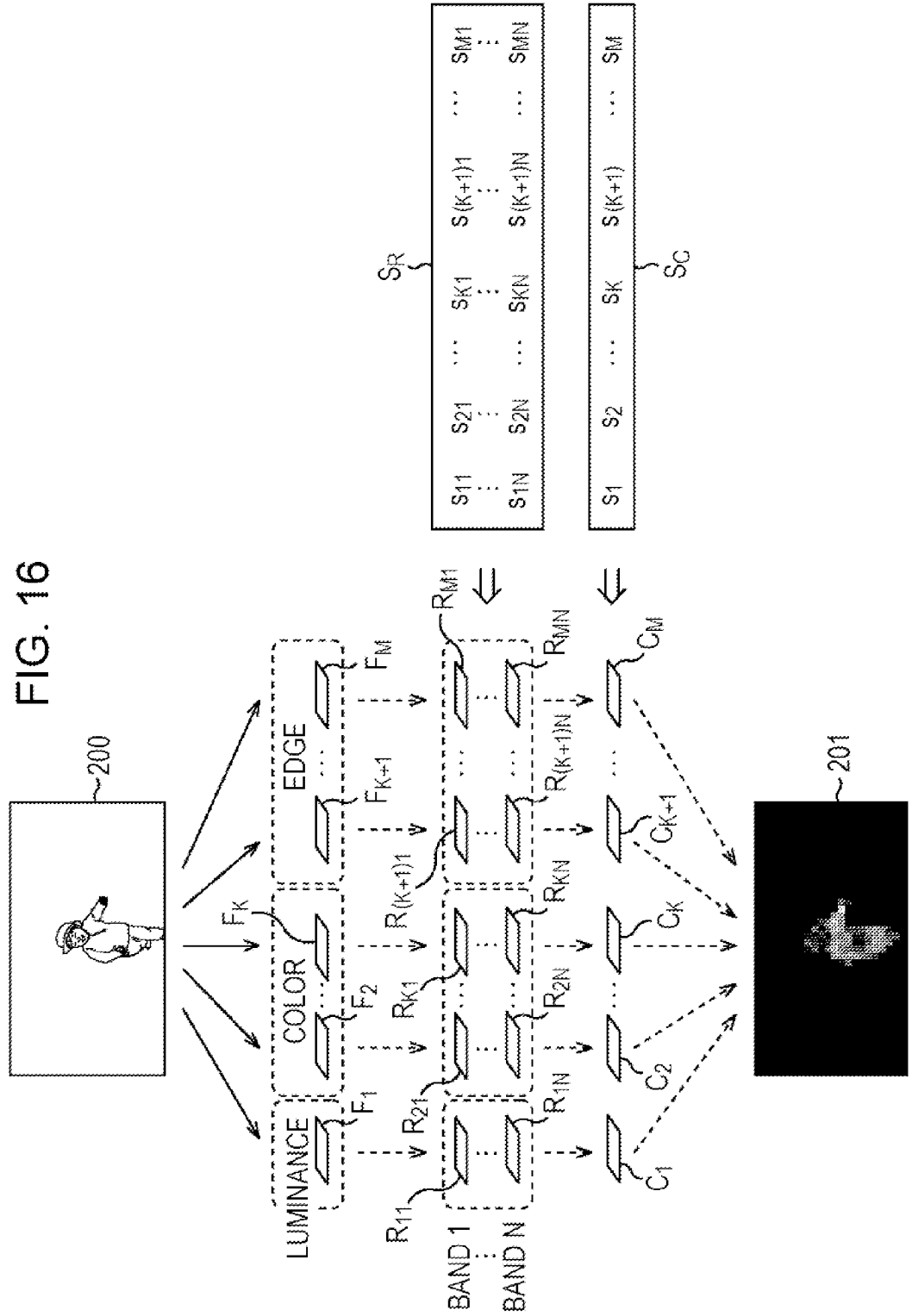
FIG. 16 is a diagram illustrating a specific example of the subject map generation process.

Specifically, as shown in FIG. 16, from the input image 200, a total of M types of feature maps are generated, which includes: a luminance feature map F1 representing the information on luminance, color feature maps F2 to FK representing the information on colors, and edge feature maps F(K+1) to FM representing the information on edges.

For example, in the luminance feature map F1, luminance components (luminance signals) Y, which can be obtained from the respective pixels of the input image, are treated as pixel values of the pixels of the feature map F1 at the same positions as the pixels of the input image. That is, the luminance feature map F1 is a feature map of which the feature is luminance and which represents the luminance values of the respective regions of the input image.

Further, in the color feature maps F2 to FK, for example, the color components (color signals) R, G, and B, which can be obtained from the respective pixels of the input image, are treated as the pixel values of the pixels of the feature map at the same positions as the pixels of the input image. In this case, at K=4, the respective feature maps F2 to F4 are treated as feature maps of which the respective features are R, G, and B components of the pixels of the input image and which are pixel values of the respective color components of the regions of the input image.

Moreover, in the edge feature maps F(K+1) to FM, for example, the edge intensities of the respective pixels of the input image in the directions of 0, 45, 90, and 135 degrees are treated as pixel values of the pixels of the feature map at the same positions as the pixels of the input image. In this case, for each of the four edge directions, a feature map is generated, in which the edge intensity of the direction is a feature and which represents the edge intensity of each region of the input image.

In addition, in the above-mentioned feature map, the average of the values of the R, G, and B components of pixels may be set as the feature amount of the feature map F1. In addition, color difference components Cr and Cb or a* and b* coordinate components in the Lab color space may be set as the feature amounts of the color feature maps F2 to FK. Further, the edge intensities of directions other than the directions of 0, 45, 90, and 135 degrees may be set as the feature amounts of the edge feature maps F(K+1) to FM.

In step S32, the band-feature map generation portion 112 extracts specific band components from the feature map so as to generate band feature maps for each feature map, and supplies the band feature maps to the band-feature map synthesis portion 113, the reference map retaining portion 74, and the matching processing portion 75.

Specifically, as shown in FIG. 16, the luminance information of predetermined bands 1 to N are extracted from the luminance information (pixel values) of the luminance feature map F1 so as to generate band feature maps R11 to R1N representing the luminance information of bands.

Further, the color information of the predetermined bands 1 to N are extracted from the color information (pixel values) of the color feature maps F2 to FK so as to generate band feature maps R21 to R2N, . . . , RK1 to RKN representing the color information of the bands.

Moreover, the edge information of the predetermined bands 1 to N are extracted from the edge information (pixel values) of the edge feature maps F(K+1) to FM so as to generate band feature maps R(K+1)1 to R(K+1)N, . . . , RM1 to RMN representing the edge information of the bands. As described above, the band-feature map generation portion 112 generates M×N types of the band feature maps.

Hereinafter, an example of the process of the band-feature map generation portion 112 will be described.

For example, the band-feature map generation portion 112 generates plural feature maps with resolutions different from each other by using the feature maps, and sets the feature maps with different resolutions as pyramid images of the feature amounts. For example, the pyramid images of 8 resolution ranks of levels L1 to L8 are generated, in which the pyramid image of the level L1 has the highest resolution and the resolution of each pyramid image becomes lower in order from the level L1 to the level L8.

In this case, the feature map, which is generated by the feature map generation portion 111, is treated as the pyramid image of the level L1. Further, in the pyramid image of the level Li (where $1 \leq i \leq 7$), the average of the pixel values of four pixels adjacent to each other is treated as a pixel value of one pixel of the pyramid image of the level L(i+1) corresponding to the four pixels. Accordingly, the pyramid image of the level L(i+1) becomes an image of which the aspect ratio is a half of the pyramid image of the level Li (the decimal part of the divided aspect ratio is truncated if it is aliquant).

Further, the band-feature map generation portion 112 selects two pyramid images with mutually different ranks among the plural pyramid images, and generates N difference images of the respective feature amounts by calculating the difference between the selected pyramid images. In addition, since the sizes (the number of pixels) of the pyramid images with the respective ranks are different, at the time of generating the difference images, the smaller pyramid image is up-converted to the larger pyramid image.

For example, the band-feature map generation portion 112 calculates, among the pyramid images of the feature amounts of the respective ranks, the differences between pyramid images of combinations of respective ranks of the levels L6 and L3, the levels L7 and L3, the levels L7 and L4, the levels L8 and L4, and the levels L8 and L5. Thereby, it is possible to obtain a total of 5 difference images of the feature amounts.

Specifically, for example, when the difference image of the combination of level L6 and level L3 is generated, the pyramid image of the level L6 is up-converted to the size of the pyramid image of the level L3. That is, the pixel value of one pixel of the pyramid image of the level L6 before the up-conversion is treated as the pixel values of several adjacent pixels of the pyramid image of the level L6 after the up-conversion, corresponding to the pixel. Then, the differences between the pixel values of the pixels of the pyramid image of the level L6 and the pixel values of the pixels of the pyramid image of the level L3 located at the same position as the corresponding pixels are calculated, and the differences are treated as the pixel values of the pixels of the difference image.

The respective N difference images, which can be obtained in such a manner, are further up-converted to the same size as the input image as necessary, and are treated as the respective band feature maps of the bands 1 to N.

As described above, by generating the difference images, as if the filtering process using a band-pass filter is applied to the feature maps, it is possible to extract feature amounts of specific band components from the feature maps. The pixel values of the pixels of the difference image obtained in such a manner represent the differences between the pixel values of the pyramid images with the respective levels, that is, the differences between the feature amounts of features in the predetermined pixels in the input image and the average feature amounts of the peripheries of the pixels.

For example, when the feature is the luminance, the pixel values of the difference image (the band feature map) represent differences between the luminance levels of the predetermined regions of the input image and the average luminance level of the peripheral regions. In general, the region, of which the luminance difference from the periphery thereof is large in the image, is a region noticeable to the observer of the image, and thus the region is highly likely to be the subject region. Accordingly, it may be said that, in each difference image (the band feature map), the pixel with a larger pixel value represents a region which is more highly likely to be the subject region. Likewise, in the cases of other features, the region, of which the feature amount difference is large as compared with the periphery thereof, is a region noticeable to a user, and thus it may be also said that the region is a region more similar to the subject.

In addition, in the above description, the width of the band extracted from the feature map depends on the combination of the respective ranks of the pyramid images at the time of generating the difference images, and the combination is optionally determined. Further, the extraction of the feature amounts of the predetermined band components is not limited to the method using the above-mentioned difference image, and another method may be used therein.

Returning to the description of the flowchart of FIG. 15, in step S33, the matching processing portion 75 performs the matching process of matching the band feature maps Rmn (where $1 \leq m \leq M$ and $1 \leq n \leq N$), which are supplied from the band-feature map generation portion 112, with the band reference maps stored in the memory 81.

Figure 17:
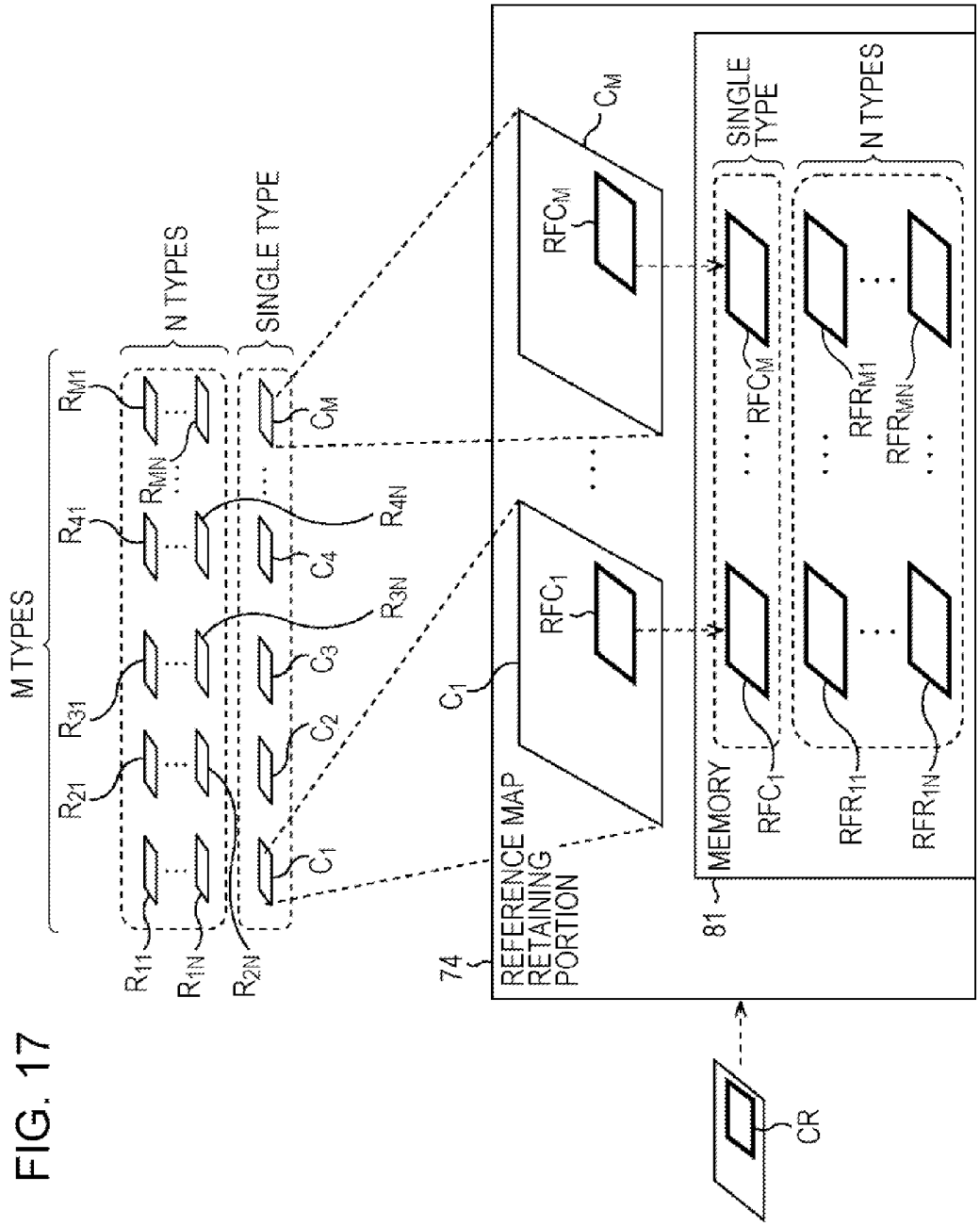
FIG. 17 is a diagram illustrating a reference map.

For example, as shown in FIG. 17, in the band-feature map generation portion 112, a total of M×N band feature maps Rmn can be obtained from the M types of the respective features for each of the N bands. Further, in the band-feature map synthesis portion 113, for each of the M types of the features, it is possible to obtain the synthetic feature map $C_m$ (where $1 \leq m \leq M$) which can be obtained by synthesizing the band feature maps.

Then, in the memory 81 of the reference map retaining portion 74, the region, which is at the same position as the subject region CR on the input image in each synthetic feature map $C_m$, is stored as the synthetic reference map $RFC_m$ (where $1 \leq m \leq M$). Further, in the memory 81, the region, which is at the same position as the subject region CR on the input image in each band feature map $R_{mn}$, is stored as the band reference map RFRmn (where $1 \leq m \leq M$ and $1 \leq n \leq N$).

Here, the band reference maps and the synthetic reference maps stored in the memory 81 can be obtained from the band feature maps and the synthetic feature maps of the frame previous to the current frame as the processing target.

When each band feature map $R_{mn}$ of the current frame is supplied from the band-feature map generation portion 112, the matching processing portion 75 searches the band feature map $R_{mn}$ for the region most similar to the band reference map $RFR_{mn}$ of the previous frame read out from the memory 81.

Figure 18:
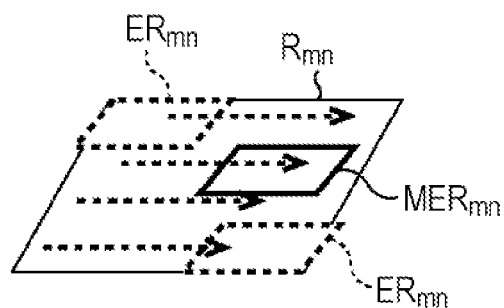
FIG. 18 is a diagram illustrating a matching process.

For example, as shown in FIG. 18, the matching processing portion 75 shifts the position of the region ERmn (where $1 \leq m \leq M$ and $1 \leq n \leq N$) as the processing target on the band feature map Rmn from the upper left side to the lower right side of the drawing while matching each region $ER_{mn}$ with each band reference map $RFR_{mn}$.

Specifically, the matching processing portion 75 calculates, for each pixel within the region $ER_{mn}$, an absolute value of the difference between the pixel value of the pixel of the region $ER_{mn}$ and the pixel value of the pixel of the band reference map $RFR_{mn}$ which is at the same position as the pixel of the region $ER_{mn}$. Then, the matching processing portion 75 calculates the sum of absolute differences (SAD) each of which is obtained for each pixel.

The matching processing portion 75 sets the region, in which the sum of absolute differences between itself and the band reference map is the minimum, among the regions $ER_{mn}$ of the band feature map $R_{mn}$ as the most similar region $MER_{mn}$ (where $1 \leq m \leq M$ and $1 \leq n \leq N$). Then, the matching processing portion 75 supplies the information representing the position of the most similar region $MER_{mn}$ and the sum of absolute differences obtained for each region $ER_{mn}$ of the band feature map $R_{mn}$ as the result of the matching process to the reliability indicator calculation portion 76.

Figure 19:
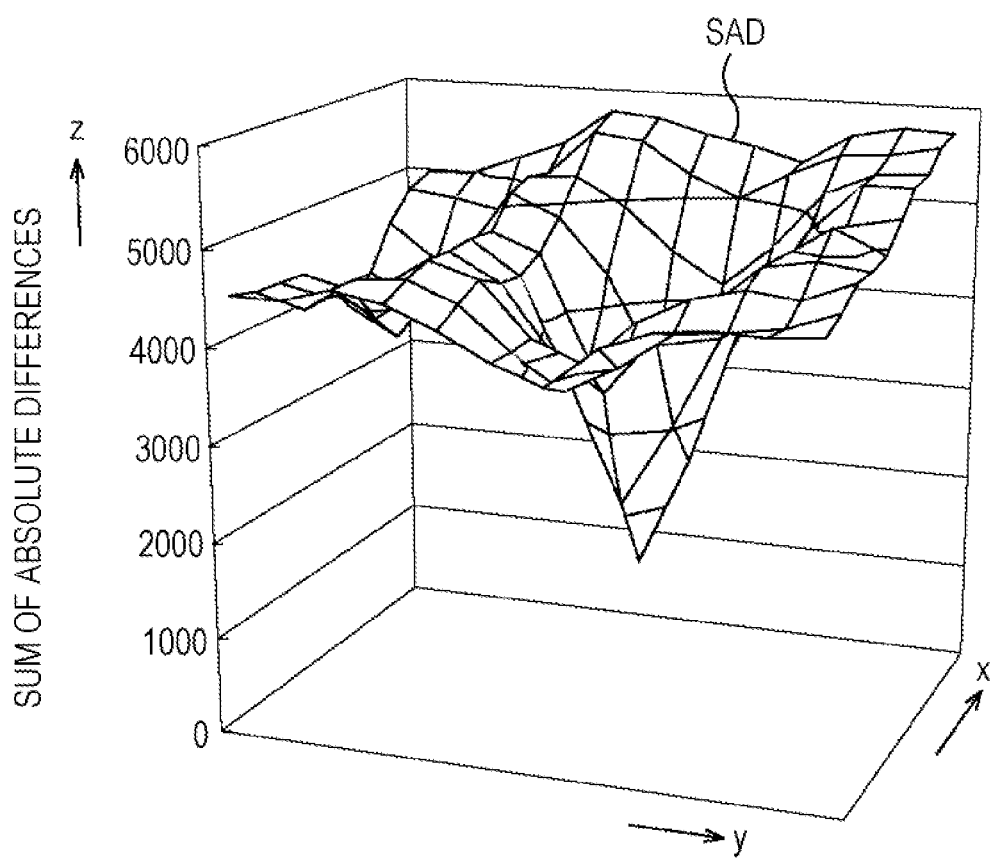
FIG. 19 is a diagram illustrating an example of a result of the matching process.

FIG. 19 shows an example of the sum of absolute differences obtained for each region $ER_{mn}$ of the band feature map $R_{mn}$ as the result of the matching process.

In FIG. 19, the xy-coordinate plane formed of the x axis and the y axis represents the entire region of the band feature map. Further, in FIG. 19, the z axis perpendicular to the xy-coordinate plane represents the magnitude of the sum of absolute differences of the band feature map, and thus scale marks of 0 to 6000 are assigned on the z axis. That is, the figure SAD shown in the xyz-coordinate space of FIG. 19 represents the sum of absolute differences for each region $ER_{mn}$ of the band feature map $R_{mn}$. It should be noted that the figure SAD is hereinafter referred to as the sum of absolute differences SAD.

As shown in FIG. 19, the values of the sum of absolute differences for the entire band feature map ranges from about 1500 to about 5800. However, the values are 4000 or more in the marginal portion of the band feature map, and are 2000 or less in the center portion thereof. In particular, in the region (the edge portion of the sum of absolute differences SAD) in the center portion of the band feature map, the value of the sum of absolute differences is a minimum value (a peak value). That is, the sum of absolute differences SAD of FIG. 19 represents that the region in the center portion of the band feature map is the most similar region.

In such a manner, as the result of the matching process, the sum of absolute differences are obtained for each of the M×N band feature maps $R_{mn}$, and each most similar region $MER_{mn}$ is specified for each of the M×N band feature maps Rmn. Then, the information representing the sum of absolute differences and the position of the most similar region of each band feature map is supplied to the reliability indicator calculation portion 76.

Here, description was given of the case where the sum of absolute differences is used as the matching process. However, any kind of process, such as the matching process using the squared differences, the histogram matching, or the template matching, may be used if the region most similar to the band reference map can be specified.

Returning to the flowchart of FIG. 15, in step S34, the reliability indicator calculation portion 76 performs the reliability indicator calculation process so as to calculate the reliability indicators (the band reliability indicators) of the band feature maps of the current frame, and supplies the indicators to the subject map generation portion 71.

Figure 20:
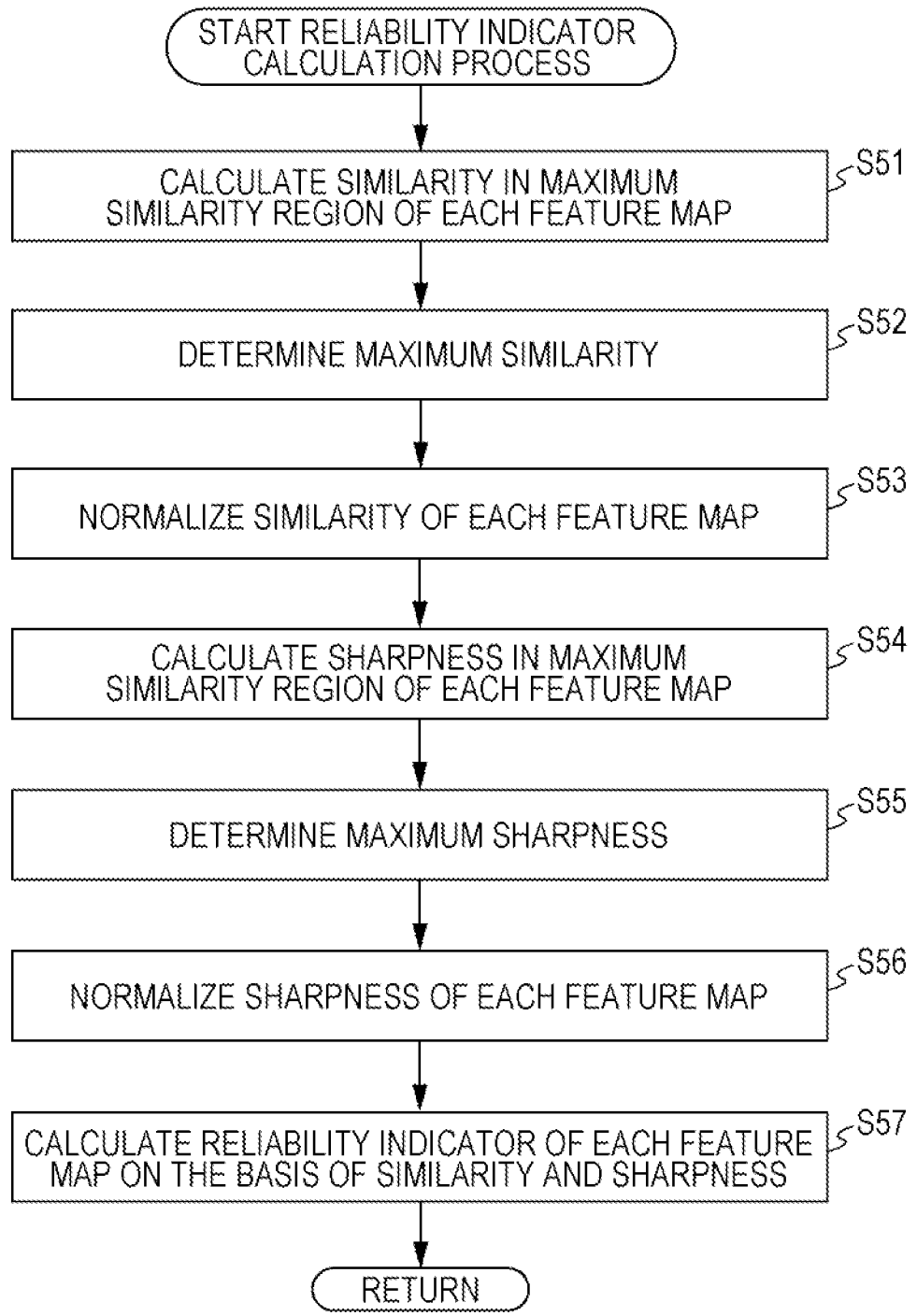
FIG. 20 is a flowchart illustrating a reliability indicator calculation process.

Hereinafter, the reliability indicator calculation process corresponding to the process of step S34 will be described in detail with reference to the flowchart of FIG. 20.

In step S51, the similarity calculation portion 171 calculates, on the basis of the result of the matching process supplied from the matching processing portion 75, the similarity LRmn (where $1 \leq m \leq M$ and $1 \leq n \leq N$) between the most similar region MERmn and the band reference map $RFR_{mn}$ of the previous frame for each of the M×N band feature maps $R_{mn}$ of the current frame. Then, the similarity calculation portion 171 supplies the similarity to the maximum similarity determination portion 172.

Here, as described above, when the sum of absolute differences is used in the matching process, assuming that the minimum value (the peak value) in the sum of absolute differences SAD shown in FIG. 19 is an $SAD_{min}$, as the minimum value $SAD_{min}$ decreases, the similarity $LR_{mn}$ increases. Specifically, for example, the similarity $LR_{mn}$ is given by $1/SAD_{min}$ which is the inverse of the minimum value of the sum of absolute differences of the band feature map.

In step S52, the maximum similarity determination portion 172 determines the M maximum similarities $MLR_m$ (where $1 \leq m \leq M$) for the M types of the feature amounts from the similarities $LR_{mn}$ of the respective band feature maps supplied from the similarity calculation portion 171, and supplies the maximum similarities $MLR_m$ to the similarity normalization portion 173 together with the similarities LRmn of the band feature maps.

In step S53, the similarity normalization portion 173 normalizes the similarity LRmn of each band feature map on the basis of the maximum similarity $MLR_m$ of each of the M types of the feature amounts supplied from the maximum similarity determination portion 172, and supplies the similarity to the reliability indicator calculation portion 177. Specifically, the value $LR_{mn}/MLR_m$, which is obtained by dividing the similarity LRmn of each band feature map by the maximum similarity $MLR_m$ for each of M types of feature amounts, is supplied as the normalized similarity SLRmn (where $1 \leq m \leq M$ and $1 \leq n \leq N$) to the reliability indicator calculation portion 177. In addition, the normalized similarity SLRmn has a value in the range of $0 < SLR_{mn} \leq 1$.

For example, at m=1, when the similarities $LR_{11}$ to $LR_{1N}$ of the band feature maps $R_{11}$ to $R_{1N}$ of the luminance are divided by the maximum similarity $MLR_1$, it is possible to obtain the values of $LR_{11}/MLR_1$ to $LR_{1N}/MLR_1$ as N normalized similarities SLR1N. The same process is performed at m=2, ..., M, thereby obtaining the M×N normalized similarities $SLR_{mn}$.

Here, the similarity LRmn of each band feature map is normalized by the maximum similarity $MLR_m$, but it is apparent that the similarity $LR_{mn}$ may be normalized by other representative values.

In step S54, the sharpness calculation portion 174 calculates, on the basis of the result of the matching process supplied from the matching processing portion 75, the sharpness level $TR_{mn}$ (where $1 \leq m \leq M$ and $1 \leq n \leq N$) of each of the M×N band feature maps $R_{mn}$ of the current frame, and supplies the sharpness level to the maximum sharpness determination portion 175.

Here, as described above, in the case of using the sum of absolute differences in the matching process, the sharpness level $TR_{mn}$ is given by $SAD_{ave} - SAD_{min}$ which is a difference between the minimum value $SAD_{min}$ of the sum of absolute differences SAD shown in FIG. 19 and the average value $SAD_{ave}$ of the sum of absolute differences of the near-field regions including the most similar region. As the sharpness level $TR_{mn}$ is larger, the sum of absolute differences SAD shown in FIG. 19 has a sharper shape in the region with the minimum value. Accordingly, as the sharpness level $TR_{mn}$ is smaller, it has a smoother shape.

In step S55, the maximum sharpness determination portion 175 determines the M maximum sharpness levels $MTR_m$ (where $1 \leq m \leq M$) for M types of the feature amounts on the basis of the sharpness levels $TR_{mn}$ of the respective band feature maps which are supplied from the sharpness calculation portion 174, and supplies the maximum sharpness levels $MTR_m$ together with the sharpness levels $TR_{mn}$ of the respective band feature map to the sharpness normalization portion 176.

In step S56, the sharpness normalization portion 176 normalizes the sharpness level $TR_{mn}$ of each band feature map on the basis of the maximum sharpness level $MTR_m$ of each of the M types of the feature amounts supplied from the maximum sharpness determination portion 175, and supplies the sharpness level to the reliability indicator calculation portion 177. Specifically, the value $TR_{mn}/MTR_m$, which is obtained by dividing the sharpness level $TR_{mn}$ of each band feature map by the maximum sharpness level $MTR_m$ for each of M types of feature amounts, is supplied as the normalized sharpness level $STR_{mn}$ (where $1 \leq m \leq M$ and $1 \leq n \leq N$) to the reliability indicator calculation portion 177. In addition, the normalized sharpness level $STR_{mn}$ has a value in the range of $0 < STR_{mn} \leq 1$.

For example, at m=1, when the sharpness levels $TR_{11}$ to $TR_{1N}$ of the band feature maps $R_{11}$ to $R_{1N}$ are divided by the maximum sharpness level $MTR_1$, it is possible to obtain the values of $TR_{11}/MTR_1$ to $TR_{1N}/MTR_1$ as N normalized sharpness levels $STR_{1N}$. The same process is performed at m=2, ..., M, thereby obtaining the M×N normalized sharpness levels $STR_{mn}$.

Here, the sharpness level $TR_{mn}$ of each band feature map is normalized by the maximum sharpness level $MTR_m$, but it is apparent that the sharpness level $TR_{mn}$ may be normalized by other representative values.

In step S57, the reliability indicator calculation portion 177 calculates the band reliability indicator $s_{mn}$ (where $1 \leq m \leq M$ and $1 \leq n \leq N$) of each band feature map on the basis of the normalized similarity $SLR_{mn}$ supplied from the similarity normalization portion 173 and the normalized sharpness level $STR_{mn}$ supplied from the sharpness normalization portion 176. On the basis of the normalized similarity $SL_{mn}$ and the normalized sharpness level $STR_{mn}$, the band reliability indicator $s_{mn}$ is given by the following Expression (1).

$$s_{mn} = f(SL_{mn}, TL_{mn}) \quad (1)$$

Here, in the Expression (1), the f(A, B) represents a function of values A and B. Specifically, for example, the band reliability indicator $s_{mn}$ is given by the following Expression (2).

$$s_{mn} = \alpha SL_{mn} + \beta TL_{mn} \quad (2)$$

Here, in Expression (2), the values α and β are set to predetermined values.

On the basis of Expression (2), as the similarity and the sharpness level is larger, the band reliability indicator $s_{mn}$ has a larger value. That is, in the sum of absolute differences SAD shown in FIG. 19, as the minimum value $SAD_{min}$ is smaller and the shape thereof in the region at the minimum value is sharper, the band reliability indicator $s_{mn}$ has a larger value.

Figure 21:
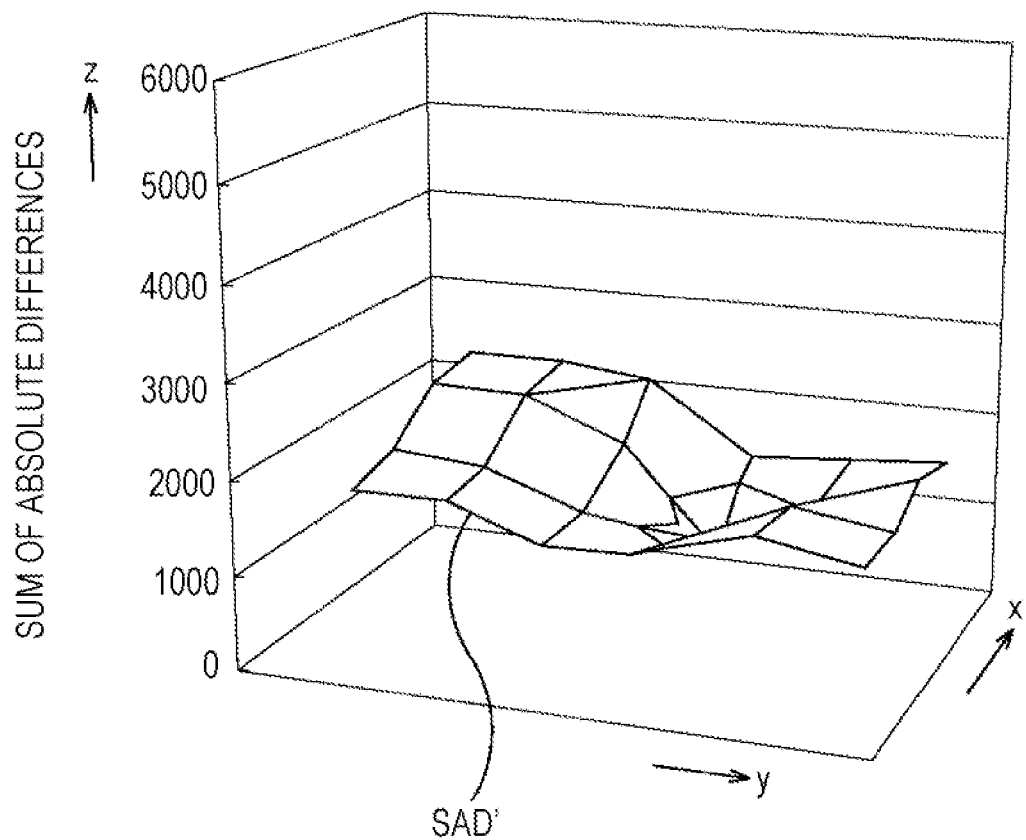
FIG. 21 is a diagram illustrating another example of the result of the matching process.

On the other hand, in the sum of absolute differences SAD' of the band feature map shown in FIG. 21, the minimum value thereof is smaller than the minimum value of the sum of absolute differences of FIG. 19, but the shape thereof in the region at the minimum value is smoother. That is, the similarity is large, but the sharpness level is small, and thus the band reliability indicator $s_{mn}$ has a small value.

As described above, the M×N band reliability indicators $s_{mn}$ corresponding to the M×N band feature maps $R_{mn}$ are obtained, and are supplied as a band reliability indicator group $S_R$ to the band-feature map synthesis portion 113 of the subject map generation portion 71.

It should be noted that the values α and β, which determine the band reliability indicator $s_{mn}$, may have the same values for each of the M×N band feature maps $R_{mn}$, but may have different values for each feature or for each band.

Returning to the description of the flowchart of FIG. 15, in step S35, the band-feature map synthesis portion 113 performs the band-feature map synthesis process. Thereby, as shown in FIG. 16, the band-feature map synthesis portion 113 generates the synthetic feature maps $C_m$ from the band feature maps $R_{mn}$ supplied from the band-feature map generation portion 112, on the basis of the band reliability indicator group $S_R$ supplied from the reliability indicator calculation portion 76. Then, the band-feature map synthesis portion 113 supplies the synthetic feature maps $C_m$ to the synthetic-feature map synthesis portion 114, the reference map retaining portion 74, and the matching processing portion 75.

Figure 22:
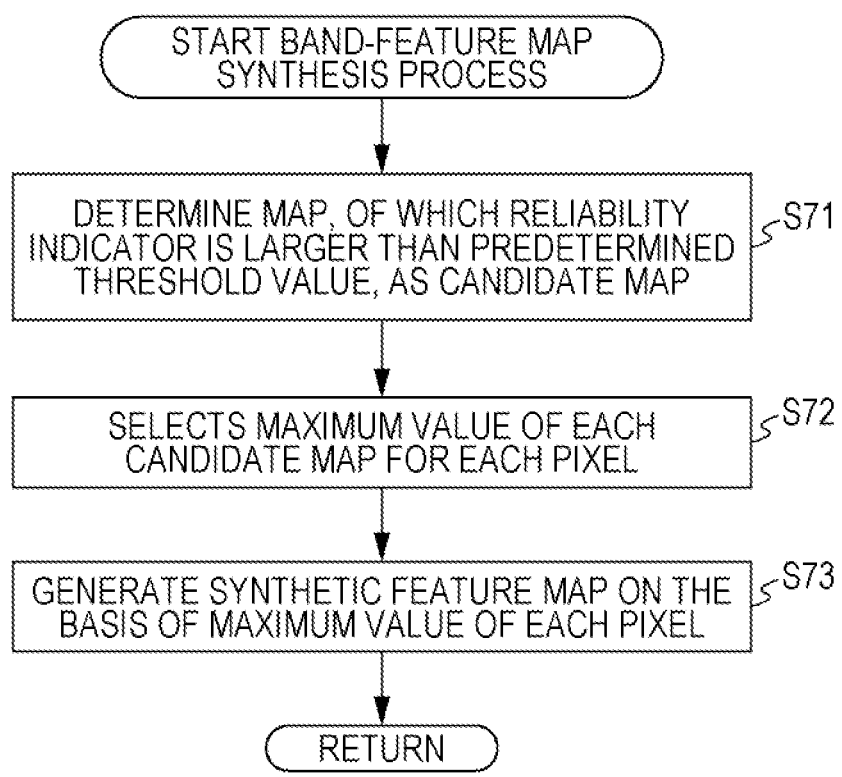
FIG. 22 is a flowchart illustrating a band-feature map synthesis process.

Here, the band-feature map synthesis process corresponding to the process of step S35 will be described in detail with reference to the flowchart of FIG. 22. The band-feature map synthesis process is performed for each of M types of feature amounts.

In step S71, the candidate map determination portion 121 determines the band feature maps, of which the band reliability indicators $s_{mn}$ supplied from the reliability indicator calculation portion 76 are larger than the predetermined threshold value, among the band feature maps $R_{mn}$ supplied from the band-feature map generation portion 112 as candidate maps (band candidate maps). The candidate map determination portion 121 supplies the determined band candidate maps to the inter-map maximum selection portion 122.

Figure 23:
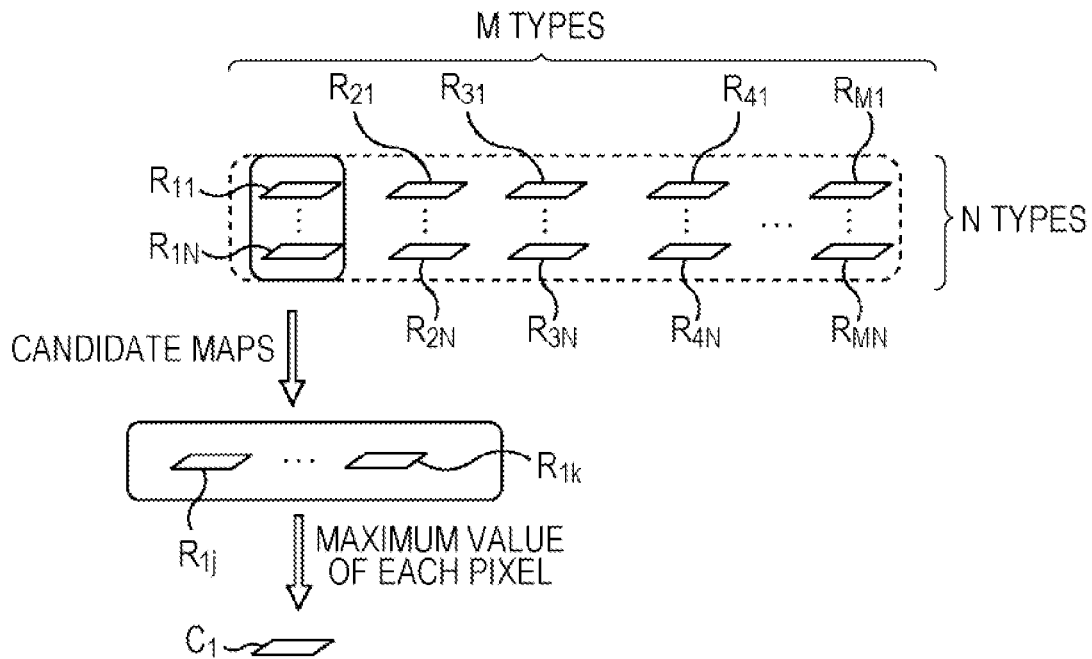
FIG. 23 is a diagram illustrating a specific example of the band-feature map synthesis process.

Specifically, for example, as shown in FIG. 23, among the band feature maps $R_{11}$ to $R_{1N}$ of the luminance, the band feature maps $R_{1j}, \ldots, R_{1k}$, of which the band reliability indicators $s_{11}$ to $s_{1N}$ are larger than the predetermined threshold value, are determined as the band candidate maps.

In step S72, the inter-map maximum selection portion 122 selects the maximum feature amount (the pixel value) among the band candidate maps, for each pixel, from the band candidate maps supplied from the candidate map determination portion 121, and performs this selection on all pixels.

Specifically, in the case of the band candidate maps $R_{1j}, \ldots, R_{1k}$ shown in FIG. 23, the inter-map maximum selection portion 122 focuses on the respective pixels which are at the same position in respective band candidate maps, selects a pixel with the maximum pixel value among the respective pixels, and performs this selection on all pixels.

In step S73, the synthetic feature map generation portion 123 generates the synthetic feature maps on the basis of the maximum pixel values each of which is selected for each pixel among the band candidate maps by the inter-map maximum selection portion 122.

Specifically, by synthesizing the maximum pixel values each of which corresponds to each pixel of the band candidate maps $R_{1j}, \ldots, R_{1k}$ shown in FIG. 23 (by employing the maximum pixel values as the pixel values of the respective pixels), the synthetic feature maps $C_m$ are generated. Then, the synthetic feature maps $C_m$ are supplied to the synthetic-feature map synthesis portion 114, the reference map retaining portion 74, and the matching processing portion 75.

As described above, the band-feature map synthesis portion 113 generates the M types of the synthetic feature maps $C_m$. In addition, more specifically, in each synthetic feature map, the pixel values of the pixels are normalized so as to be in the range of, for example, 0 to 255. Further, in the first subject map generation process, each band reliability indicator $s_{mn}$ of the band reliability indicator group $S_R$ is treated as 1, and the maximum values of the respective pixels are selected from the respective band feature maps of each feature amount.

Returning to the description of the flowchart of FIG. 15, in step S36, the matching processing portion 75 performs the matching process of matching the synthetic feature map $C_m$ (where $1 \leq m \leq M$) supplied from the band-feature map synthesis portion 113 and the synthetic reference map $RFC_m$ (where $1 \leq m \leq M$) stored in the memory 81.

Here, in the matching process of the synthetic feature map $C_m$, the same process as the matching process of the band feature map is performed.

That is, for example, the matching processing portion 75 shifts the position of the region $EC_m$ (where $1 \leq m \leq M$) as the processing target on the synthetic feature map $C_m$ while calculating the sum of absolute differences between the pixel values of the pixels of the region $EC_m$ and the synthetic reference map $RFC_m$. Then, the matching processing portion 75 sets the region, in which the sum of absolute differences between itself and the synthetic reference map is the minimum, among the region $EC_m$ of the synthetic feature map $C_m$ as the most similar region $MEC_m$ (where $1 \leq m \leq M$). The matching processing portion 75 supplies the information representing the position of the most similar region $MEC_m$ and the sum of absolute differences obtained for each region $EC_m$ of the synthetic feature map $C_m$ as the result of the matching process to the reliability indicator calculation portion 76.

In step S37, the reliability indicator calculation portion 76 performs the reliability indicator calculation process so as to calculate the reliability indicators (the synthetic reliability indicators) of the synthetic feature maps of the current frame, and supplies the indicators to the subject map generation portion 71.

Here, the process of calculating the reliability indicators of the synthetic feature maps is performed basically in the same way as the process of calculating the reliability indicators of the band feature maps described with reference to the flowchart of FIG. 20, and thus detail description thereof will be omitted.

That is, in the process of calculating the reliability indicators of the band feature maps, first, on the basis of the result of the matching process supplied from the matching processing portion 75, the similarities $LC_m$ (where $1 \leq m \leq M$) between the reference maps of the previous frame and the most similar regions $MEC_m$ of the M synthetic feature maps $C_m$ of the current frame are calculated. Next, from the similarities $LC_m$ of the respective synthetic feature maps, the maximum similarities $MLC_m$ are determined, and on the basis of this, the M normalized similarities $SLC_m$ are obtained.

On the other hand, on the basis of the result of the matching process obtained from the matching processing portion 75, the sharpness levels $TC_m$ (where $1 \leq m \leq M$) of the M synthetic feature maps $C_m$ of the current frame is calculated. Next, from the sharpness levels $TC_m$ of the respective synthetic feature maps, the maximum sharpness levels $MTC_m$ are determined, and on the basis of this, the M normalized sharpness levels $STC_m$ are obtained.

Then, on the basis of the normalized similarity $SLC_m$ and the normalized sharpness level $STC_m$, the synthetic reliability indicators $s_m$ (where $1 \leq m \leq M$) of the respective synthetic feature maps are obtained.

As described above, the M synthetic reliability indicators $s_m$ of the M synthetic feature maps are obtained, and are supplied as a synthetic reliability indicator group $S_C$ to the synthetic-feature map synthesis portion 114 of the subject map generation portion 71.

In step S38, the synthetic-feature map synthesis portion 114 performs the synthetic-feature map synthesis process. Thereby, as shown in FIG. 16, the synthetic-feature map synthesis portion 114 generates the subject map 201 from the synthetic feature map $C_m$ supplied from the band-feature map synthesis portion 113, on the basis of the synthetic reliability indicator group $S_C$ supplied from the reliability indicator calculation portion 76. Then, the synthetic-feature map synthesis portion 114 supplies the subject map 201 to the subject-candidate region squaring portion 72.

Figure 24:
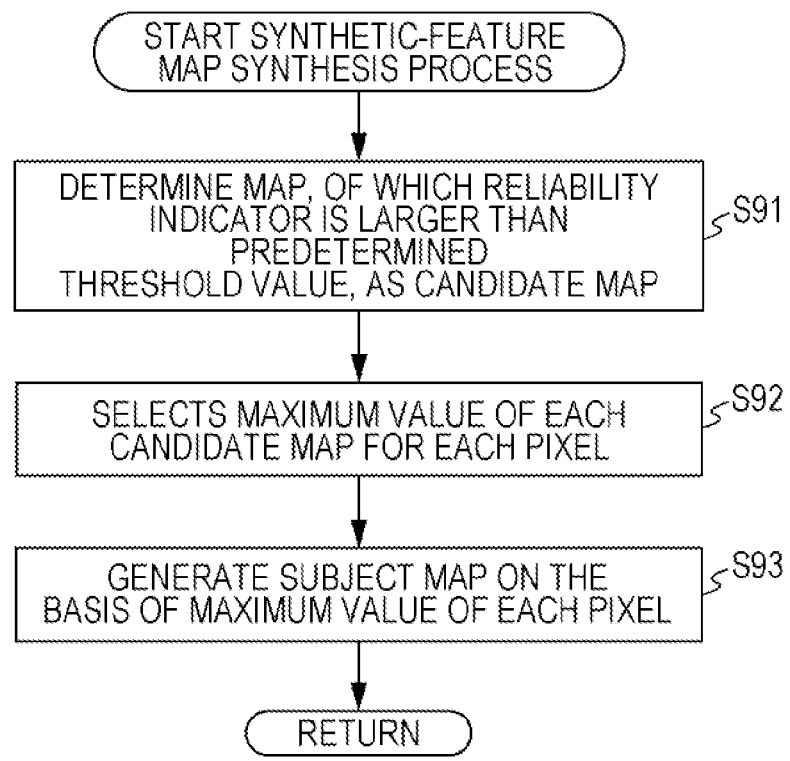
FIG. 24 is a flowchart illustrating a synthetic-feature map synthesis process.

Here, the synthetic-feature map synthesis process corresponding to the process of step S38 will be described in detail with reference to the flowchart of FIG. 24.

In step S91, the candidate map determination portion 124 determines the synthetic feature maps, of which the synthetic reliability indicators $s_m$ supplied from the reliability indicator calculation portion 76 are larger than the predetermined threshold value, among the synthetic feature maps $C_m$ supplied from the band-feature map synthesis portion 113 as candidate maps (synthetic candidate maps). The candidate map determination portion 124 supplies the determined synthetic candidate maps to the inter-map maximum selection portion 125.

Figure 25:
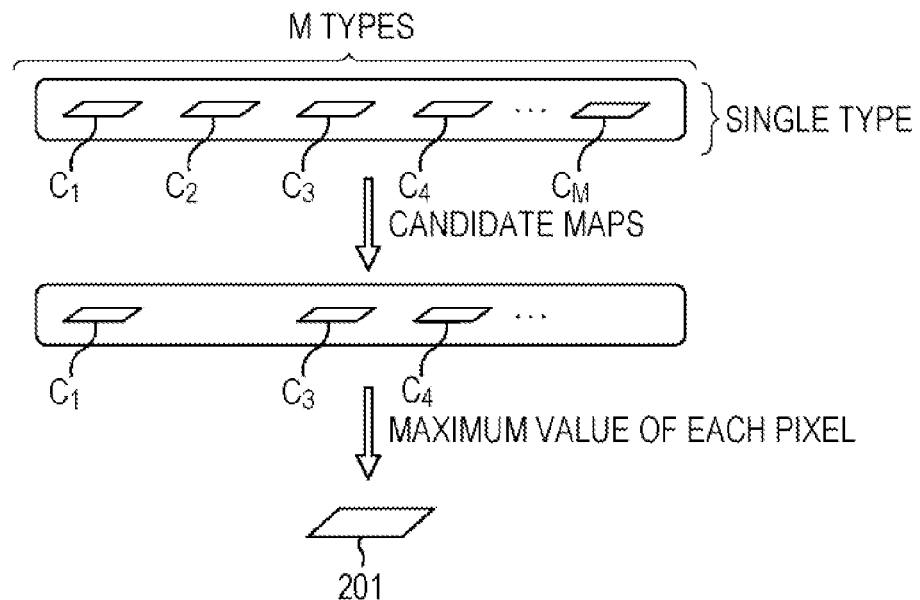
FIG. 25 is a diagram illustrating a specific example of the synthetic-feature map synthesis process.

Specifically, for example, as shown in FIG. 25, among the M synthetic feature maps $C_1$ to $C_M$, the synthetic feature maps $C_1, C_3, C_4, \ldots$ of which the synthetic reliability indicators $s_1$ to $s_m$ are larger than the predetermined threshold value, are determined as the synthetic candidate maps.

In step S92, the inter-map maximum selection portion 125 selects the maximum feature amount (the pixel value) among the synthetic candidate maps, for each pixel, from the synthetic candidate maps supplied from the candidate map determination portion 124, and performs this selection on all pixels.

Specifically, in the case of the synthetic candidate maps $C_1, C_3, C_4, \ldots$ shown in FIG. 25, the inter-map maximum selection portion 125 focuses on the respective pixels which are at the same position in respective synthetic candidate maps, selects a pixel with the maximum pixel value among the respective pixels, and performs this selection on all pixels.

In step S93, the subject map generation portion 126 generates the subject map on the basis of the maximum pixel values each of which is selected for each pixel among the synthetic candidate maps by the inter-map maximum selection portion 125.

Specifically, by synthesizing the maximum pixel values each of which corresponds to each pixel of the synthetic candidate maps $C_1, C_3, C_4, \ldots$ shown in FIG. 25 (by employing the maximum pixel values as the pixel values of the respective pixels), the subject map 201 is generated. Then, the subject map 201 is supplied to the subject-candidate region squaring portion 72.

The pixel values of the respective pixels of the subject map, which can be obtained in such a manner, are normalized so as to be in the range of, for example, 0 to 255, and the subject map is treated as the final subject map.

In addition, in the first subject map generation process, each synthetic reliability indicator $s_m$ of the synthetic reliability indicator group $S_C$ is treated as 1, and the maximum values of the respective pixels are selected from the respective synthetic feature maps.

Figure 14:
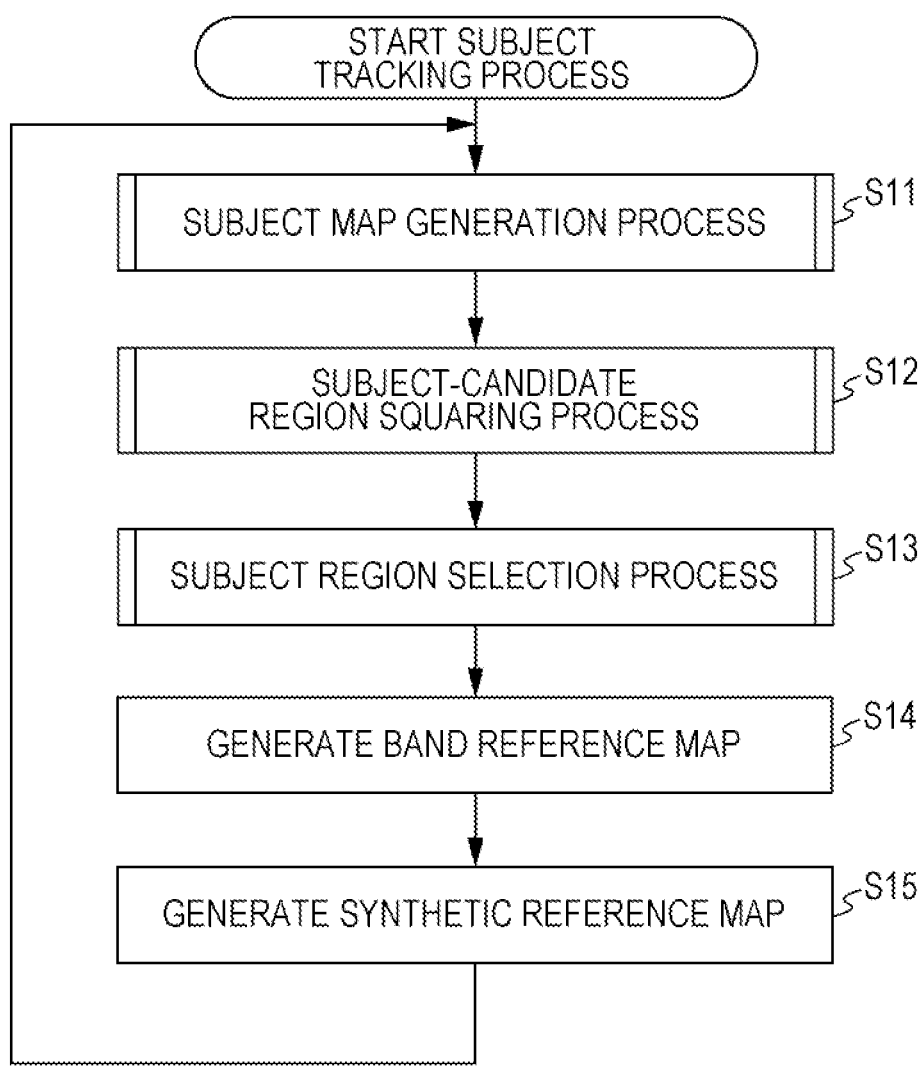
FIG. 14 is a flowchart illustrating a subject tracking process.

When the subject map is generated, the subject map generation process ends, and then the process advances to step S12 of FIG. 14.

Returning to the flowchart of FIG. 14, in step S12, the subject-candidate region squaring portion 72 performs the subject-candidate region squaring process, thereby determining the subject-candidate regions on the subject map supplied from the subject map generation portion 71.

Figure 26:
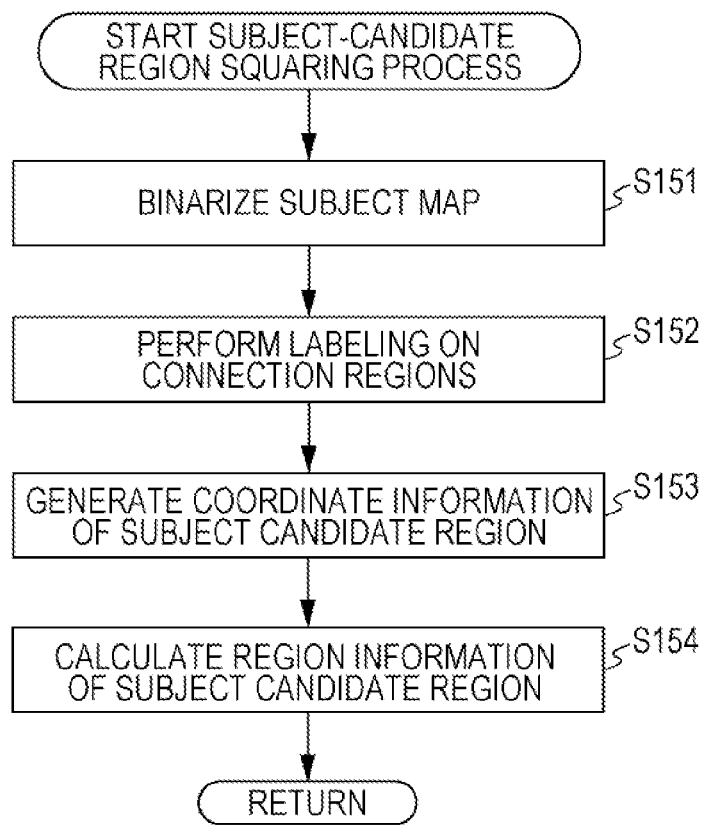
FIG. 26 is a flowchart illustrating a subject-candidate region squaring process.
Figure 27:
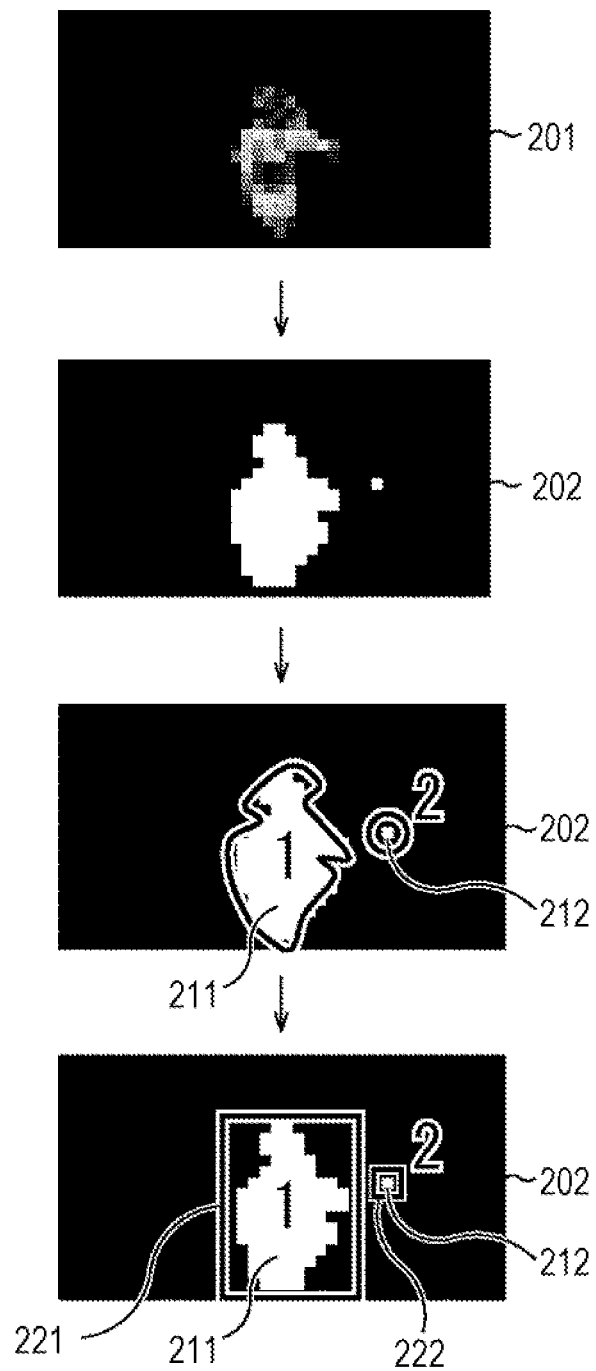
FIG. 27 is a diagram illustrating a specific example of the subject-candidate region squaring process.

Hereinafter, referring to FIGS. 26 and 27, the subject-candidate region squaring process will be described in detail. FIG. 26 is a flowchart illustrating the subject-candidate region squaring process. FIG. 27 is a diagram illustrating a specific example of the subject-candidate region squaring process.

In step S151 of the flowchart of FIG. 26, the binarization processing portion 131 of the subject-candidate region squaring portion 72 binarizes the pixel values of the pixels of the subject map supplied from the synthetic-feature map synthesis portion 114 through a threshold value process, and supplies the binary pixel values to the labeling processing portion 132.

More specifically, when the pixel values of the respective pixels of the subject map 201 range from 0 to 255, as shown in FIG. 27, the binarization processing portion 131, for example, sets the pixel values which are smaller than a threshold value of "127" to 0, and sets the pixel values which are larger than the threshold value of "127" to 1.

In such a manner, it is possible to obtain a binarized map 202 of the second picture from the top in FIG. 27. The binarized map 202 shown in FIG. 27 is the binarized subject map. In the binarized map 202, the white color portions represent the pixels of which the pixel values are 1, and the black color portion represents the pixels of which the pixel values are 0. Here, the threshold value is set to 127, but may be set to a different value.

In step S152, the labeling processing portion 132 performs the morphological operation on the binarized map 202 supplied from the binarization processing portion 131, squares the subject region on the binarized map 202, and performs the labeling on the connected regions which are obtained.

Specifically, the labeling processing portion 132 performs the labeling on the connected regions, which are adjacent to each other and are formed of the pixels with the pixel values of 1, in the binarized map 202 (the binarized subject map). For example, as shown in the third picture from the top of FIG. 27, the label of "1" is attached to the connected region 211 on the binarized map 202, and the label of "2" is attached to the connected region 212. The labeling processing portion 132 supplies the labeled binarized map (the subject map) to the rectangular region coordinate calculation portion 133.

In step S153, the rectangular region coordinate calculation portion 133 sets the rectangular region, which surrounds the connected regions on the binarized map 202 supplied from the labeling processing portion 132, as the subject-candidate region, and generates the coordinate information representing the position of the subject-candidate region.

Specifically, as shown in the fourth picture from the top of FIG. 27, in the binarized map 202, the rectangular area (the circumscribed area) 221, which surrounds the connected region 211 labeled by "1" from its outer side, is detected, and is set as a subject-candidate region. In addition, for example, in the drawing of the subject-candidate region, the coordinates of the upper-left and lower-right vertexes are obtained, and the coordinates thereof are set as coordinate information.

Further, the rectangular area 222, which surrounds the connected region 212 labeled by "2" from its outer side, is detected, and is set as a subject-candidate region. Thus, in the drawing of the subject-candidate region, the coordinates of the upper-left and lower-right vertexes are generated as coordinate information.

The rectangular region coordinate calculation portion 133 generates the coordinate information of each subject-candidate region, and then supplies the coordinate information to the region information calculation portion 134.

In step S154, the region information calculation portion 134 calculates the region information of each subject-candidate region by using the coordinate information supplied from the rectangular region coordinate calculation portion 133 and the subject map supplied from the synthetic-feature map synthesis portion 114.

For example, the region information calculation portion 134 calculates, as region information, the sizes of the subject-candidate regions and the coordinates of the center positions of the subject-candidate regions in the subject map.

Further, the region information calculation portion 134 calculates, as region information, the integral value (summation) of the pixel values of the pixels within the subject-candidate regions on the subject map or the peak value (maximum value) of the pixel values of the pixels within the subject-candidate regions on the subject map.

The region information calculation portion 134 calculates the region information on each subject-candidate region, supplies the coordinate information and the region information of each subject-candidate region which can be obtained, to the subject region selection portion 73, and terminates the subject-candidate region squaring process. Thereafter, the process advances to step S13 of FIG. 14.

Returning to the flowchart of FIG. 14, in step S13, the subject region selection portion 73 performs the subject region selection process, thereby selecting the subject region from the subject-candidate regions.

Figure 28:
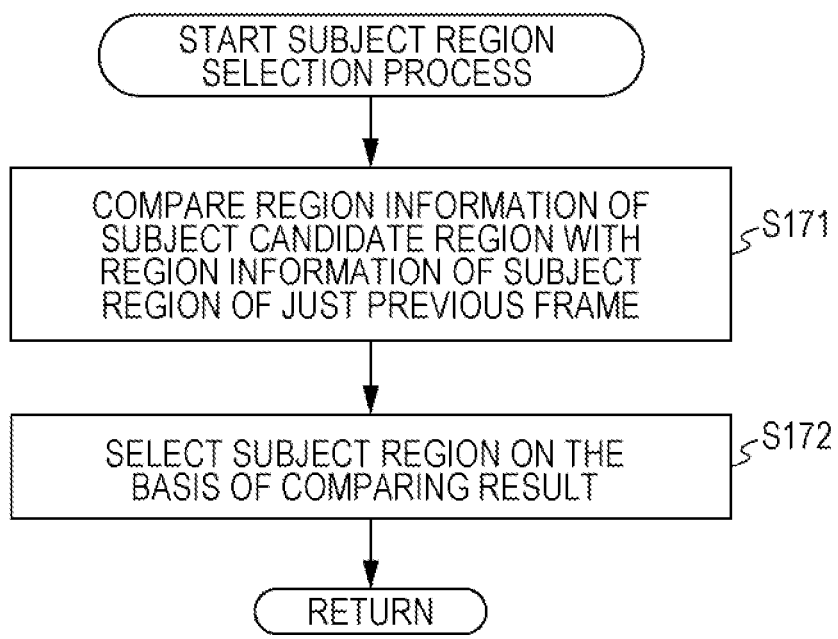
FIG. 28 is a flowchart illustrating a subject region selection process.

Here, referring to the flowchart of FIG. 28, the subject region selection process of step S13 will be described in detail.

In step S171, the region information comparing portion 151 compares the region information of each subject-candidate region supplied from the region information calculation portion 134 with the region information of the subject region of the previous frame stored in the region information storage portion 153. Then, the region information comparing portion 151 supplies the comparing result and the coordinate information of each subject-candidate region supplied from the region information calculation portion 134 to the subject region determination portion 152.

Specifically, for example, when the sizes of the subject-candidate regions are calculated as the region information, the region information comparing portion 151 compares the sizes of subject-candidate regions, that is, the sizes of the rectangular areas surrounding the subject-candidate regions with the size of the subject region of the previous frame. In this case, for example, the absolute difference between the size of each subject-candidate region and the size of the subject region can be obtained as a comparing result.

Further, for example, the coordinates of the center positions of the subject-candidate regions are obtained as the region information, and the coordinates of each center position are compared with the coordinates of the center positions of the subject region of the previous frame. In this case, the distance between the center positions can be obtained as the comparing result.

Moreover, when the peak value and the integral value of the pixel values of the pixels within the subject-candidate region are obtained, the absolute difference between the peak value or the integral value of the subject-candidate region and the peak value or the integral value of the subject region of the previous frame can be obtained as the comparing result.

In step S172, the subject region determination portion 152 selects one of the subject-candidate regions as the subject region in the current frame of the processing target on the basis of the comparing result supplied from the region information comparing portion 151. In other words, when a specific feature, that is, the region information is set as an indicator, among the subject-candidate regions of the current frame, the subject-candidate region, which is most highly correlated with the subject region of the previous frame, is treated as the subject region of the current frame.

Specifically, for example, the subject-candidate region with the smallest absolute differences of the region information, which can be obtained as the comparing result, is selected as the subject region. Here, the differences includes the difference between the sizes of the subject-candidate region and the subject region, the distance between the center positions thereof, the difference between the peak values thereof, and the difference between the integral values thereof.

Further, the subject region determination portion 152 determines the subject region of the current frame, and then supplies the region information of the determined subject region to the synthesis processing portion 62. Moreover, the subject region determination portion 152 supplies and stores the region information of the subject region to and in the region information storage portion 153, and terminates the subject region selection process. Then, the process advances to step S14 of FIG. 14.

In addition, in the first subject region selection process, the region information storage portion 153 does not store the region information of the subject region of the previous frame. Hence, the subject-candidate regions including the first selection region, which is selected by a user at the time of the start of the subject tracking process and is most similar to the initially selected region, are treated as the subject region.

Returning to the flowchart of FIG. 14, in step S14, the reference map retaining portion 74 generates the band reference maps on the basis of the coordinate information of the subject region supplied from the subject region determination portion 152 and the band feature maps supplied from the band-feature map generation portion 112.

Specifically, the reference map retaining portion cuts out, as described with reference to FIG. 17, the regions with the same area as the subject region on the input image in the band feature maps $R_{mn}$ of the current frame, and sets the cutout regions as the band reference maps $RFR_{mn}$ (where $1 \leq m \leq M$ and $1 \leq n \leq N$). The reference map retaining portion 74 supplies and stores the generated band reference maps to and in the memory 81. The band reference maps are used in calculating the band reliability indicators of the subsequent frame.

In step S15, the reference map retaining portion 74 generates the synthetic reference maps on the basis of the coordinate information of the synthetic feature map supplied from the band-feature map synthesis portion 113 and the subject region supplied from the subject region determination portion 152.

That is, similarly to the generation of the band reference map, the reference map retaining portion 74 cuts out the regions with the same area as the subject region on the input image in the synthetic feature maps $C_m$ of the current frame, and sets the cutout regions as the synthetic reference map $RFC_m$ (where $1 \leq m \leq M$). The reference map retaining portion 74 supplies and stores the generated synthetic reference maps to and in the memory 81. The synthetic reference maps are used in calculating the synthetic reliability indicators of the subsequent frame.

In step S15, when the synthetic reference maps are generated, thereafter, the process returns to step S11, and the above-mentioned process is repeated. That is, the subject tracking process is performed on the subsequent frames, and thus the process is repeated for each one frame.

In the above-mentioned process, for each frame, from each feature map of the frame, the regions, which are highly correlated with the subject region of the previous frame in the map, are detected. In response to the detection result, the reliability indicator for the map is calculated, and the subject map is generated from the maximum values of the respective pixels of the feature maps with the high reliability indicators.

In the detection of the subject using the subject map, the regions, which are more highly correlated with the subject region of the previous frame, are continuously and adaptively treated as important. Hence, even under circumstances in which the subject state changes, such as the case in which the light illuminated on the subject changes and the case in which the pose of the subject changes, as compared with the methods of performing the tracking on the basis of the feature amounts of the initially designated region in the related art, it is possible to more stably track the subject.

Moreover, since the subject map is generated from the feature amounts of the plurality of features extracted from the input image, even when the feature amounts of several features drastically change, if the changes in the feature amounts of the other features are small, it is possible to detect the subject with sufficient accuracy, and thus it is possible to perform stabilized tracking.

Further, since the subject region is determined so as to include the entire subject, even under circumstances in which a partial region of the subject changes, it is possible to more stably track the subject.

In particular, in the subject tracking methods in the related art, in the case of indentifying the coordinates (or a partial region including the coordinates) of something within the subject region, the entire subject is not tracked, and thus it is difficult to correctly set the detection ranges of the AF (Auto Focus), the AE (Auto Exposure), and the ACC (Auto Color Control). Further, in the case of indentifying the feature amount region in which the feature amounts are identical in the subject region, it is possible to improve the accuracy in setting the detection range as compared with the above-mentioned case. However, the identical feature amount region is mostly just a small portion of the subject region, and thus it is difficult to obtain sufficient detection accuracy.

On the other hand, in the subject tracking process according to the embodiment of the technology, it is possible to identify the subject region including the entire subject, and thus the detection accuracy can be improved. Consequently, it is possible to apply the tracking result to various applications.

Further, in the subject tracking methods in the related art, for example, there is the method of detecting and tracking a person for example by registering an entire image of the person in a dictionary through learning. However, it is difficult to track the subjects other than the person registered in the dictionary. Moreover, the volume of the information (the image) which is registered in the dictionary becomes large, and thus the size of the apparatus increases.

In contrast, in the subject tracking process of the embodiment of the technology, it is possible to detect and track an optional subject, and besides it is not necessary to register the huge volume of the information in the dictionary or the like. Hence, it is possible to make the size of the apparatus compact.

Further, for example, when the band feature maps of the specific bands generated in the band-feature map generation process of the subject map generation process are synthesized by a simple linear combination, in the band feature maps, the subject component (that is, the feature amount of a small region of a texture), which originally tends to be attenuated, near direct current is further attenuated by the simple linear combination. In this case, as the subject has a comparatively simpler shape, it may be more difficult to obtain the levels of the feature amounts particularly in the center portion of the subject region. In addition, in the binarization process of the subject-candidate region squaring process in the subsequent stage, there is a concern about an adverse effect that it is difficult to obtain correct connected regions.

However, in the subject tracking process, by selecting any one of the pixels among feature maps, the subject map is generated. Therefore, it is possible to obtain any feature amount in the subject region of the subject map. Accordingly, even when the subject has a comparatively simpler shape, it is possible to avoid the situation in which it is difficult to obtain the feature amount in the subject part. Thus, in the binarization process, it is possible to specify correct connected regions, and it is also possible to perform stable subject tracking.

Moreover, in the subject tracking process according to the embodiment of the technology, the regions (the most similar region), which are highly correlated with the subject region of the previous frame in feature maps, are detected, and in response to the detection result, the reliability indicators for the feature maps are calculated, thereby generating the subject map from the feature maps (the candidate maps) of which the reliability indicators are larger than the predetermined threshold value. Therefore, it is possible to exclude the feature maps, of which the reliability indicators are smaller than the predetermined threshold value, that is, the feature maps, which are less correlated with the subject region of the previous frame, from the subject map generation process. Accordingly, since it is possible to lower the possibility that a region different from the real subject region is determined as the subject region, it is possible to more accurately specify the subject.

Further, in the band-feature map synthesis process and the synthetic-feature map synthesis process, by performing the threshold value process on the reliability indicators of the respective feature maps, the candidate maps are determined. However, by performing the threshold value process on the reliability indicator for each pixel unit of each feature map, the candidate pixels, which are candidates to be synthesized as the synthetic feature map or the subject map, may be determined.

In this case, the threshold value is changed depending on whether or not each processing target pixel is included in the most similar region on the feature map. Specifically, for the pixels not included in the most similar region, by setting the threshold value to be high, even in the case of the pixels of the feature maps of which the reliability indicators are relatively high, the pixels are less likely to be included in the subject region, and thus it is possible to exclude the pixels from the candidate pixels. In contrast, for the pixels included in the most similar region, by setting the threshold value to be low, even in the case of the pixels of the feature maps of which the reliability indicators are relatively low, the pixels are highly likely to be included in the subject region, and thus it is possible to employ the pixels as the candidate pixels. In this way, the maximum values of the respective pixels are selected from the determined candidate pixels, and on the basis of the pixels of the maximum values, the synthetic feature map or the subject map is generated. Thereby, it is possible to lower the possibility that a region different from the real subject region is determined as the subject region, it is possible to further more accurately specify the subject.

Moreover, in the band-feature map synthesis process and the synthetic-feature map synthesis process, the maximum feature amount among the candidate maps is selected for each pixel from the candidate maps, but the feature amount is not limited to the maximum value. For example, the second highest value, the median, or the like may be selected as the feature amount of each pixel among the candidate maps. In such a manner, it is possible to exclude the pixels which have locally large feature amounts caused by disturbance although not in the subject region.

In the above description, the luminance component, the color component, and the edge intensity are used as the feature amounts, but the feature amounts are not limited to this. For example, motion information may be added. Further, as available feature amounts, for example, feature amounts, which have complementary relationship like the luminance component and the color component, are appropriate, and the feature amounts may be arbitrarily selected.

Further, in the above description, for the respective M×N band feature maps and M synthetic feature maps, the respective reliability indicators are calculated, but the reliability indicators of a part of the maps may be properly calculated. For example, only the synthetic reliability indicators of the M synthetic feature maps of the synthetic feature maps $C_1$ to $C_M$ may be calculated. In such a case, it is possible to suppress computational complexity in the image processing device 11.

Furthermore, in the above description, by calculating the similarities and sharpness levels from the sum of absolute differences of the feature maps, on the basis of them, the reliability indicators are calculated. However, when the sum of absolute differences is not used in the matching process, by using a predetermined statistical method on the basis of the result of the matching process, the degrees of distribution of the feature amounts in the vicinities of the most similar regions on the feature maps of the processing target frame may be calculated, and the reliability indicators, which are large as the degrees of distribution are small, may be calculated.

Moreover, in the current frame of the processing target, only the regions with a predetermined size including the subject region of the previous frame are set as the processing target regions, and the matching process of the band feature maps or the synthetic feature maps may be performed thereon. In such a case, when the sizes or the positions of the processing target regions are changed in accordance with the size or the moving speed of the subject which is tracked in the previous frame, it is possible to more efficiently and more reliably detect the region which is highly correlated.

The above-mentioned series of processes may be performed by hardware, and may be performed by software. When the series of processes is performed by software, the programs constituting the software are installed from a program recording medium in a computer built in the dedicated hardware or for example a general personal computer or the like capable of performing various functions by installing various programs.

Figure 29:
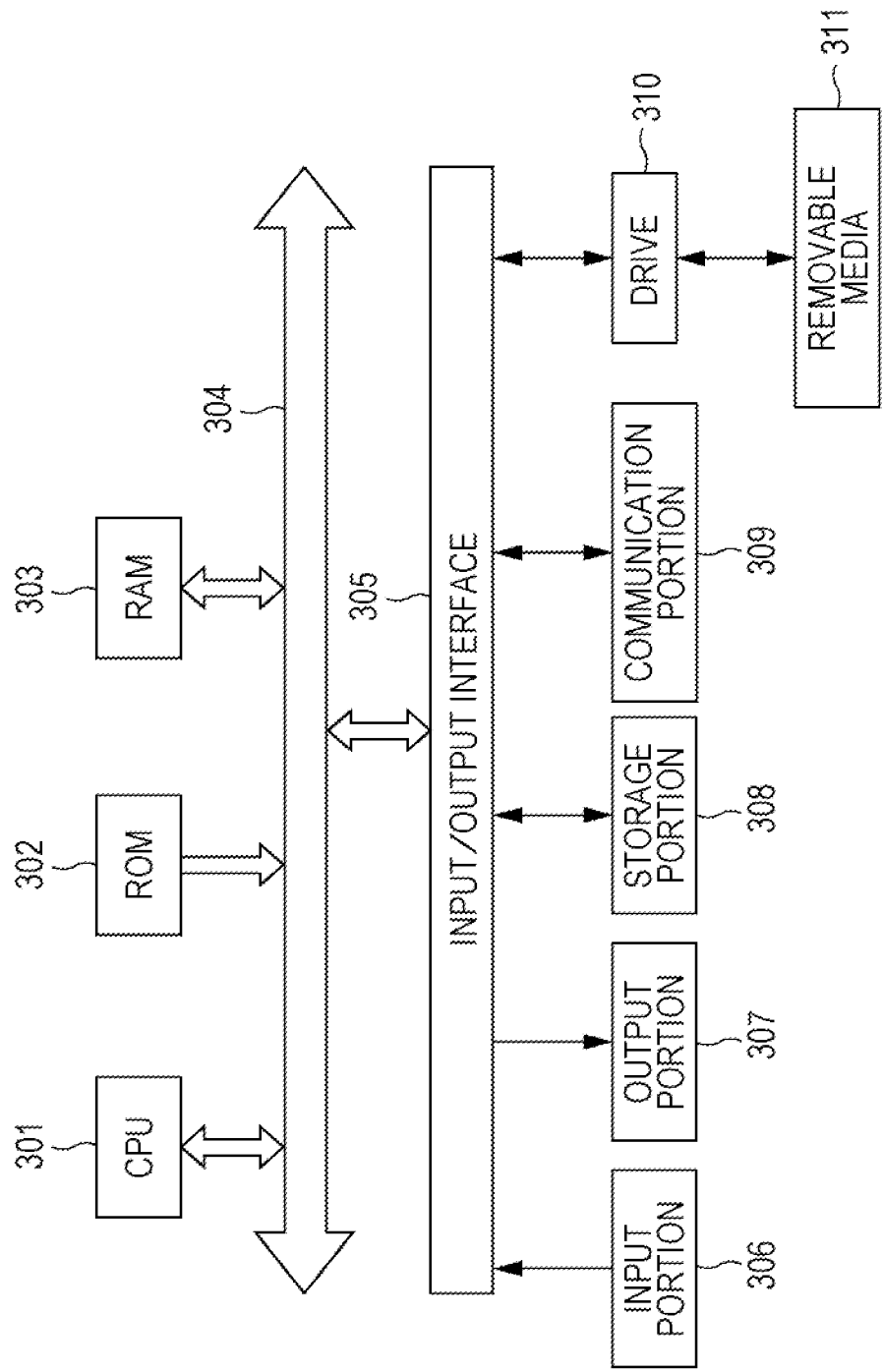
FIG. 29 is a block diagram illustrating an exemplary configuration of hardware of a computer.

FIG. 29 is a block diagram illustrating an exemplary configuration of the hardware of the computer which performs the above-mentioned series of processes through a program.

In the computer, a CPU (Central Process Unit) 301, a ROM (Read Only Memory) 302, and a RAM (Random Access Memory) 303 are connected to each other through a bus 304.

The bus 304 is further connected to an input/output interface 305. The input/output interface 305 is connected to: an input portion 306 which is formed of a keyboard, a mouse, a microphone, and the like; an output portion 307 which is formed of a display, a speaker, and the like; a storage portion 308 which is formed of a hard disk, non-volatile memory, and the like; a communication portion 309 which is formed of a network interface and the like; and a drive 310 which drives a removable medium 311 such as a magnetic disk, an optical disc, a magneto-optical disk, or a semiconductor memory.

In the computer configured as described above, for example, the CPU 301 loads and executes the program, which is stored in the storage portion 308, in the RAM 303 through the input/output interface 305 and the bus 304, thereby performing the above-mentioned series of process.

The program executed by the computer (the CPU 301) is stored in the removable medium 311 which is a package medium formed as, for example, the magnetic disk (including a flexible disk), the optical disc (CD-ROM (Compact Disc-Read Only Memory), DVD (Digital Versatile Disc), or the like), the magneto-optical disk, the semiconductor memory, or the like. Alternatively, the program is provided through a wired or wireless transmission medium such as a local area network, an internet, or a digital satellite broadcast.

In addition, the program can be installed in the storage portion 308 through the input/output interface 305 by mounting the removable medium 311 in the drive 310. Further, the program can be installed in the storage portion 308 by allowing the communication portion 309 to receive the program through the wired or wireless transmission medium. Besides, the program can be installed in advance in the ROM 302 or the storage portion 308.

In addition, the program executed by the computer may be a program which chronologically performs the process in order of description of the present specification, and may be a program which performs the process in parallel or at the necessary timing such as the time of calling.

The embodiments of the present technology are not limited to the above-mentioned embodiments, and may be modified into various forms without departing from the technical scope of the present technology.

In addition, the present technology may adopt the following configurations.

(1) An image processing device including a synthesis processing portion configured to perform a synthesis process of performing addition on pixels including a region of a subject included in an input image and terminate the synthesis process on the basis of a detection result of a subject detection portion which detects the subject of the input image.

(2) The image processing device according to (1), further including the subject detection portion configured to detect a size of the subject, wherein the synthesis processing portion is configured to terminate the synthesis process on the basis of the size of the subject.

(3) The image processing device according to (2), wherein the synthesis processing portion is configured to retain a maximum of the size which is detected in the subject detection portion, determine a time when the size detected in the subject detection portion reaches a predetermined ratio of the maximum of the size which is retained, and terminate the synthesis process.

(4) The image processing device according to (3), wherein the synthesis processing portion is configured to perform a process of repeating addition processes, which sequentially perform addition on difference images of the subject obtained from the input image, multiple times as the synthesis process until terminating the synthesis process, and add first one of the difference images obtained from the input image, in which the subject is detected, to a resulting image of the addition in the previous addition process in each of the second and following addition processes among the addition processes performed multiple times.

(5) The image processing device according to any one of (2) to (4), wherein the subject detection portion is also configured to detect a position of the subject in the input image, and wherein the synthesis processing portion is configured to perform addition on the pixels of the region of the subject, and perform a smoothing process on pixels around the region of the subject.

(6) The image processing device according to (5), wherein the synthesis processing portion is configured to perform weighted addition using a predetermined coefficient on the pixels of the region of the subject in the input image.

(7) The image processing device according to (6), wherein the predetermined coefficient is a coefficient for changing a color of the detected subject.

(8) The image processing device according to any one of (1) to (7), further including a display control section configured to perform control so as to simultaneously display the input image and an image which is obtained after the synthesis process is performed on the input image in the synthesis processing portion.

(9) An image processing method including a step of causing an image processing device, which has a synthesis processing portion configured to perform a synthesis process on at least a part of a region of an input image, to perform a synthesis process of performing addition on pixels including a region of a subject included in an input image and terminate the synthesis process on the basis of a detection result of a subject detection process of detecting the subject of the input image.

(10) A computer-readable recording medium storing a program that causes a computer to execute processes of: performing a synthesis process of performing addition on pixels including a region of a subject included in an input image; and terminating the synthesis process on the basis of a detection result of a subject detection process of detecting the subject of the input image.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
   circuitry configured to:
   perform extraction of a subject image representing a subject from each frame of an input image;
   detect a size of the subject image;
   determine whether the size of the subject image meets a predetermined condition; and
   perform a synthesis process to synthesize the subject image of a current frame of the input image with a previously synthesized image in a case the size does not meet the predetermined condition and terminate the synthesis process in a case the size meets the predetermined condition.

2. The image processing device according to claim 1, wherein the circuitry is configured to retain a maximum of the size which is detected.

3. The image processing device according to claim 2,
   wherein the circuitry is configured to detect a position of the subject in the input image,
   to perform addition on pixels of a region of the subject, and to perform a smoothing process on pixels around the region of the subject.

4. The image processing device according to claim 3, wherein the circuitry is configured to perform weighted addition using a predetermined coefficient on the pixels of the region of the subject.

5. The image processing device according to claim 4, wherein the predetermined coefficient is a coefficient for changing a color of the subject.

6. The image processing device according to claim 1, wherein the circuitry is configured to perform control so as to simultaneously display the input image and an image which is obtained after the synthesis process is performed on the input image.

7. An image processing method comprising:
   performing extraction of a subject image representing a subject from each frame of an input image;
   detecting a size of the subject image;
   determining whether the size of the subject image meets a predetermined condition; and
   performing a synthesis process to synthesize the subject image of a current frame of the input image with a previously synthesized image in a case the size does not meet the predetermined condition and terminate the synthesis process in a case the size meets the predetermined condition.

8. A non-transitory computer-readable storage medium storing a program that causes a computer to execute:
   performing extraction of a subject image representing a subject from each frame of an input image;
   detecting a size of the subject image;
   determining whether the size of the subject image meets a predetermined condition; and
   performing a synthesis process to synthesize the subject image of a current frame of the input image with a previously synthesized image in a case the size does not meet the predetermined condition and terminate the synthesis process in a case the size meets the predetermined condition.

9. The image processing device according to claim 1, wherein the subject is fireworks.

10. The image processing device according to claim 1, wherein the size of the subject image meets the predetermined condition in a case the size of the subject image of a current frame of the input image is greater than a maximum size of the subject image of a previous frame of the input image.

11. The image processing device according to claim 1, wherein the circuitry is further configured to repeat the extraction, the detection of the size, the determination of whether the size meets the predetermined condition and the synthesis process for another subject for a predetermined number of times.

12. The image processing device according to claim 11, wherein the predetermined number of times is specified by a user.

13. The image processing device of claim 1, wherein the circuitry is configured to determine whether to terminate the synthesis process based on whether the size reaches a predetermined ratio of a maximum of the size which is retained.

14. The image processing method of claim 7, wherein whether the synthesis process is terminated is based on whether the size reaches a predetermined ratio of a maximum of the size which is retained.

15. The non-transitory computer-readable storage medium of claim 8, wherein whether the synthesis process is terminated is based on whether the size detected reaches a predetermined ratio of a maximum of the size which is retained.

16. The image processing device according to claim 1, wherein the circuitry is configured to repeat the extraction, the detection of the size, the determination of whether the predetermined condition is met and the synthesis process for another subject in accordance with a determination whether an operation is performed by a user to change a photography mode.

17. The image processing method according to claim 7, wherein the circuitry is configured to repeat the extraction, the detection of the size, the determination of whether the predetermined condition is met and the synthesis process for another subject in accordance with a determination whether an operation is performed by a user to change a photography mode.

18. The non-transitory computer-readable storage medium of claim 8, wherein the extraction, the detection of the size, the determination of whether the predetermined condition is met and the synthesis process are repeated for another subject in accordance with a determination whether an operation is performed by a user to change a photography mode.

19. The image processing method of claim 7 further comprising:
   detecting a position of the subject in the input image;
   performing addition on pixels of a region of the subject; and
   performing a smoothing process on pixels around the region of the subject.

20. The non-transitory computer-readable storage medium of claim 8, wherein the program causes the computer to execute:
   detecting a position of the subject in the input image;
   performing addition on pixels of a region of the subject; and
   performing a smoothing process on pixels around the region of the subject.

* * * * *